US007861753B2

(12) United States Patent
Walker

(10) Patent No.: US 7,861,753 B2

(45) Date of Patent: Jan. 4, 2011

(54) DUAL-EDGE IRREGULAR BEVEL-CUT SYSTEM AND METHOD

(75) Inventor: Andrew Nicholas Walker, Trinity, NC (US)

(73) Assignee: Mannington Mills, Inc., Salem, NJ (US)

( * ) Notice: Subject to any disclaimer, the term of this patent is extended or adjusted under 35 U.S.C. 154(b) by 171 days.

(21) Appl. No.: 12/334,784

(22) Filed: Dec. 15, 2008

(65) Prior Publication Data

US 2009/0159156 A1 Jun. 25, 2009

Related U.S. Application Data

(60) Provisional application No. 61/082,577, filed on Jul. 22, 2008, provisional application No. 61/056,085, filed on May 27, 2008, provisional application No. 61/042,842, filed on Apr. 7, 2008, provisional application No. 61/015,349, filed on Dec. 20, 2007.

(51) Int. Cl.
*B23Q 15/00* (2006.01)

(52) U.S. Cl. ....................... 144/356; 144/360; 144/363; 409/145; 409/159; 409/162

(58) Field of Classification Search ................. 144/356, 144/359, 360, 2.1, 363; 409/145, 156, 159–162
See application file for complete search history.

(56) References Cited

U.S. PATENT DOCUMENTS

| | | | | |
|---|---|---|---|---|
| 3,779,294 A * | 12/1973 | Gillis | 144/117.3 |
| 3,916,965 A * | 11/1975 | Attridge et al. | 144/142 |
| 4,077,448 A | 3/1978 | Hasenwinkle et al. | |
| 4,287,693 A | 9/1981 | Collette | |
| 5,468,101 A * | 11/1995 | Shoda | 409/202 |
| 6,254,075 B1 * | 7/2001 | Kozima | 269/73 |
| 6,617,009 B1 * | 9/2003 | Chen et al. | 428/195.1 |
| 6,761,008 B2 * | 7/2004 | Chen et al. | 52/586.1 |
| 6,794,002 B2 * | 9/2004 | Shinbo | 428/40.1 |
| 6,986,934 B2 * | 1/2006 | Chen et al. | 428/195.1 |
| 2007/0283648 A1 | 12/2007 | Chen | |
| 2010/0000172 A1 | 1/2010 | Vermeulen et al. | |

FOREIGN PATENT DOCUMENTS

| | | |
|---|---|---|
| FR | 2 252 467 | 6/1975 |
| WO | WO 2007/106352 A2 | 9/2007 |
| WO | WO 2009/018260 A1 | 2/2009 |

OTHER PUBLICATIONS

International Search Report and Written Opinion for corresponding International Patent Application No. PCT/US2008/086794 dated Mar. 20, 2009 (19 pages).

* cited by examiner

*Primary Examiner*—Shelley Self
(74) *Attorney, Agent, or Firm*—Kilyk & Bowersox, P.L.L.C.

(57) ABSTRACT

A system is provided for creating bevel edges on a plank. In some embodiments, the system comprises two bevel-cutting tools disposed in fixed positions and two guided cylinders disposed to independently move two edges of a plank to within varying degrees of contact with the bevel-cutting tools. Separate controllers can be provided to independently control the time, frequency, and rate of movement of the guided cylinders. Methods are provided for creating the appearance of a hand-scraped wood plank. A method for creating irregular bevel edges on a plank is also provided as are a system and method that use a plank production line operation. A plank having irregular beveled edges and the appearance of a hand-scraped wood plank is also provided.

11 Claims, 26 Drawing Sheets

DUAL-EDGE IRREGULAR BEVEL-CUT SYSTEM AND METHOD

This application claims the benefit under 35 U.S.C. §119 (e) of prior U.S. Provisional Patent Application No. 61/082,577, filed Jul. 22, 2008, U.S. Provisional Patent Application No. 61/056,085, filed May 27, 2008, U.S. Provisional Patent Application No. 61/042,842, filed Apr. 7, 2008, and U.S. Provisional Patent Application No. 61/015,349, filed Dec. 20, 2007, which are incorporated in their entirety by reference herein.

FIELD

The present invention relates to a system for creating bevel edges on a plank, particularly to a flooring plank. The present invention further relates to methods of making a plank having a bevel edge and planks with an irregular bevel edge(s).

BACKGROUND

Hand scraped hardwood flooring is becoming extremely popular in homes and commercial properties. Although this type of flooring has only recently become fashionable it has been around for many centuries. Before the invention of modern sanding techniques, all floors were hand scraped at the location where they were to be installed to ensure that the floor would be flat and even. This method today, however, is used instead to provide texture and richness, as well as a unique look and feel, to the flooring.

Although manufacturers have produced machines that can provide a hand scraped look to their flooring products, the products look cheap compared to the real thing. One problem with using a machine to scrape the flooring is that it provides a uniform look to the pattern of the flooring plank. Such planks lack the natural feel that would be seen with a floor that has been made of planks that have been scraped by hand. When done by hand, scraping creates a truly unique look to the floor. The actual look and feel of each floor, however, will vary as it depends on the skill of the person actually carrying out the scraping work.

To better accentuate hand scraped wood flooring, a bevel edge would further heighten the hand hewn characteristics of the floor. One problem with machine produced scraped wood, however, is that the profile edges are either square-edged or beveled to a uniform dimension.

Accordingly, there is a need for a system of creating a bevel edge on a flooring plank and for a method of making planks having a bevel edge that simulates a hand scraped bevel edge.

SUMMARY

A feature of the present invention is to provide a system for creating bevel edges on a plank, for example, a beveling system for creating bevel edges that vary in width and depth.

Another feature of the present invention is to provide a system for creating irregular bevel edges on a plank that give the appearance of hand-scraped bevel edges.

A further feature of the present invention is to provide a system that randomly moves a plank edge toward and away from the cutting surfaces of two stationary bevel tools.

A further feature of the present invention is to provide a system to create irregular bevel edges on a plank that can be used in a flooring system.

A further feature of the present invention is to provide a method for creating irregular bevel edges on a plank by varying the depth of the bevel-cuts.

A further feature of the present invention is to provide a method for creating irregular bevel edges on a plank, which have the appearance of hand-scraped bevel-cuts.

Another feature of the present invention is to provide a beveling system that can be incorporated with other cutting stations and profiling stations in a plank production line.

A further feature of the present invention is to provide a plank having irregular bevel edges that give the appearance of hand-scraped bevel edges.

Additional features and advantages of the present invention will be set forth in the description that follows, and in part will be apparent from the description, or may be learned by practice of the present invention. The features and other advantages of the present invention will be realized and attained by means of the elements and combinations particularly pointed out in the written description and appended claims.

To achieve these and other features, and in accordance with the purposes of the present invention, as embodied and broadly described herein, the present invention relates to a system for creating irregular beveled edges on a plank. The system can comprise a beveling system, a cutting station for cutting two profiles in two respective edges of a blank plank to form a profiled plank, and a conveyer adapted to convey a profiled plank from the cutting station to the beveling system.

In accordance with the purposes of the present invention as embodied and broadly described herein, the present invention relates to a method for creating irregular bevel edges on a plank. The method for creating irregular bevel edges on a plank can comprise moving opposing edges of the plank in a longitudinal direction into contact with respective bevel tools while keeping the bevel tools in fixed positions, to form bevel-cuts on the two edges of the plank. The plank can be moved in a linear direction normal to the longitudinal direction while the opposing edges of the plank are in contact with the cutting blades of the two bevel tools. The plank can be moved through a bevel-cut station under control of a programmed controller, for example, a controller programmed to move the opposing edges of the plank independently through a series of patterned or random movements toward and away from the respective cutting blades.

In the method, the depth of each bevel-cut can be varied from a maximum depth to a minimum depth, and/or the depth of each bevel-cut can be continuously varied, for example, gradually varied, as opposed to stepped, between the maximum depth and the minimum depth of each bevel-cut.

In accordance with the purposes of the present invention as embodied and broadly described herein, the present invention further relates to a plank comprising at least one bevel-cut edge having a varying depth bevel-cut. The bevel-cut edge can include a plurality of locations that reach the same maximum bevel-cut depth. Each of the maximum bevel-cut depth locations can be separated from one or more adjacent maximum bevel-cut depth locations by a length of bevel-cut edge that does not include a bevel-cut of maximum depth.

The present invention further relates to a surface covering comprising a plurality of planks as described herein having bevel-cut edges of varying depth.

It is to be understood that both the foregoing general description and the following detailed description are exemplary and explanatory only and are intended to provide further explanation of the present invention, as claimed.

BRIEF DESCRIPTION OF THE DRAWINGS

The accompanying drawings, which are incorporated in and constitute a part of this application, illustrate several embodiments of the present invention, and together with the description, serve to explain the principles of the present invention without limiting the present invention.

DETAILED DESCRIPTION OF THE PRESENT INVENTION

Figure 1:
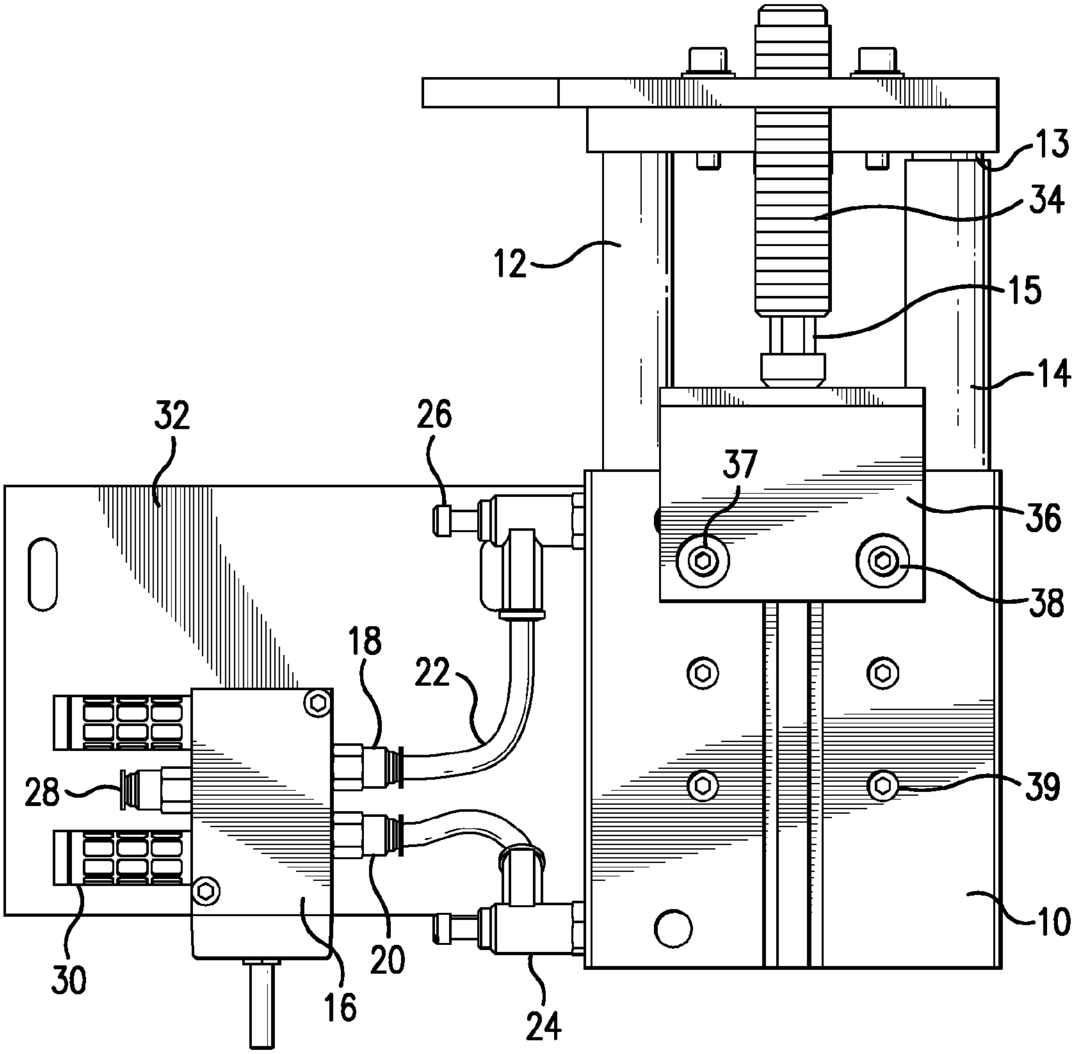
FIG. 1 is a front view of an apparatus used in various embodiments of the beveling system of the present invention.

The present invention relates to a beveling system for creating one or more bevel edges on a plank, for example, on opposite edges of a flooring plank. The beveling system can create one or more irregular bevel surface on the edge of the plank. The plank can be used, for example, as a flooring surface or for other uses. The plank can comprise, for example, a rectangular flooring plank. The system can comprise a pneumatic servomechanism positioned adjacent a beveling tool. The servomechanism can move a plank in a linear direction toward, against, and away from one or more cutting blades of one or more fixed beveling tools. The system can randomly lift one or more edges of a plank away from, and can randomly lower the one or more edges toward, the cutting blades of one or more beveling tools. The system can thus randomly vary the width and depth of the bevel-cut in order to give the plank the appearance of a hand-scraped plank.

The system can comprise at least one bevel tool, for example, two bevel tools, each positioned such that, in operation, each bevel tool can be adapted to cut a bevel into a respective edge of a plank. Each bevel tool can be, and remain, in a fixed position while a plank is moved toward and away from the bevel tool.

Although the systems described herein are primarily shown and described as a dual-edge irregular bevel-cut system, it is to be understood that the present invention also relates to a single-edge bevel-cut systems comprising one or more of the features described herein.

The system can comprise a first guide shoe. The first guide shoe can be adapted to contact a first face of a plank. The first guide shoe can comprise, for example, a pneumatic shoe. The first guide shoe can guide a plank in a longitudinal direction. The first guide shoe can comprise a roller that provides a roller surface on which the plank can contact and ride as it travels through a bevel-cut station. The first guide shoe can also comprise a recess into which the roller can be recessed, for example, fully recessed such that a plank can travel across the first guide shoe without contacting the roller surface.

A servomotor, cylinder, and/or an adjustment mechanism can be provided to move the roller into and/or away from the recess. As such, the roller can be moved between a fully recessed position whereby a surface of a plank can be bevel-cut without contacting the roller, and an extended position whereby a surface of a plank can contact the roller during a bevel-cut operation. In dual-edge bevel-cut embodiments, a pair of such first guide shoes can be provided in the system, one respective guide shoe for each of two edges that are bevel-cut according to the present methods.

The system can further comprise a plank drive adapted to move a plank in the longitudinal direction. The plank drive can comprise a conveyor belt. A second guide shoe can be adapted to contact a second face of the plank, which is opposite the first face of the plank. The system can further comprise a biasing device adapted to bias the second guide shoe in a direction toward the first guide shoe. The biasing device can, for example, apply air pressure to a cylinder configured to move the second guide shoe.

The system can comprise a respective guided cylinder for each respective first guide shoe adapted to move the first guide shoe in a linear direction that is normal to the longitudinal direction of movement of the plank. The system can be adapted to move each guided cylinder in a linear direction from a minimum, fully retracted position, to a maximum, fully extended position. In some embodiments, the acceleration rate and deceleration rate of the guided cylinder movement can be controlled and established at a desired rate, and in some instances, can be varied and/or random.

The system can comprise one or more pressure sources each adapted to apply sufficient pressure to cause movement of a respective one of the one or more guided cylinders in respective linear directions. The system can comprise at least one control valve for each respective pressure source and adapted to control a respective pressure source to actuate movement of a respective guided cylinder in a linear direction. Each control valve can actuate its respective guided cylinder to extend, retract, or extend and retract, a respective first guide shoe between a maximum (extended) position and a minimum (retracted) position.

The system can comprise a controller adapted to independently or non-independently control each control valve. The controller can be programmed to actuate movement of each guided cylinder from a maximum position along a linear direction to a minimum position along a linear direction, and to actuate movement continuously and variably between the maximum position and the minimum position. The controller can be programmed to actuate movement of each guided cylinder at defined time intervals or at random time intervals, for example, within defined parameters. The controller can be programmed to control the time, frequency, and rate of movement for each guided cylinder of the system.

The beveling system can further include a plank. The plank can be moved by a plank drive in a longitudinal direction. The plank can be guided by a first guide shoe adapted to contact a first face of the plank. The plank can be further guided by a second guide shoe. The second guide shoe can be in contact with a second face of a plank that is opposite the first face. For example, the first guide shoe can be in contact with a top face of the plank, and the second guide shoe can be in contact with a bottom face of the plank. The plank can comprise, for example, a floor plank for a flooring system. By way of example, the floor plank can have a width of about 5 inches and a length of about 4 feet. The plank can comprise, for example, a laminated flooring plank.

The beveling system can comprise a guided cylinder adapted to move a first guide shoe in a linear direction that is normal to the longitudinal direction. The guided cylinder can comprise, for example, a Festo guided gas cylinder (Part No. DFM 50-125-P-A-G-F, available from Festo Corporation, Hauppauge, N.Y.), or, in some embodiments, a guided gas cylinder that has dampeners in both a direction of extension and in an opposite direction of withdrawal/or retraction. The dampeners can comprise shock absorbers, air shocks, spring shocks, or gas dampening mechanisms and/or chambers. An exemplary gas cylinder with dampening in both an extension direction and in a retraction direction is part no. 150094 SLE 40 10 KF A G YV YHG 0, available from Festo Corporation, Hauppaugue, N.Y. A pressure source can be adapted to apply sufficient pressure to cause movement of the guided cylinder in a linear direction. The pressure source can comprise, for example, compressed air, and the pressure can comprise positive air pressure. The air pressure can be applied, for example, at a range of from about 10 pounds per square inch (psi) to about 200 psi, within a range of from about 50 psi to about 160 psi, or within a range of from about 90 psi to about 120 psi.

The guided cylinder can move a first guide shoe in a linear direction in a range of, for example, from about 0.5 millimeter (mm) to about 100 mm, in a range of from about 1 mm to about 50 mm, in a range of from about 1 mm to about 10 mm, or in a range of from about 1 mm to about 3 mm. The system can comprise a stroke limiter in operational contact with the guided cylinder to limit movement of the guided cylinder.

The beveling system can comprise a controller adapted to actuate movement of a guided cylinder. The controller can be programmed to actuate movement of a guided cylinder to a maximum position and to a minimum position. The controller can be programmed to actuate movement of one or more guided cylinders to a maximum position at least twice, and to a minimum position at least twice, during a period of time that is required for the plank-drive to move an entire plank past the cutting blade of the bevel tool. The controller can be programmed to randomly actuate movement of the one or more guided cylinders. The controller can be programmed to randomly actuate movement of the one or more guided cylinders to a maximum position and to a minimum position within user defined limits. For example, a random movement that reaches the maximum or minimum position from about one time to about twelve times per plank, or in a range of from about two times to about eight times per plank, or in a range of from about three times to about six times per plank, or any other number of times, for a plank having a length of about four feet.

The system can comprise a bevel tool disposed in a fixed position. The bevel tool can be adjustable such that, in operation, the bevel tool can be adapted to cut a bevel having any angle, for example, having an angle ranging from about 0° to about 90°, ranging from about 20° to about 60°, or ranging from about 30° to about 45°.

The system can create a bevel edge on a plank, which varies in width. The bevel edge width can range, for example, from about 0 mm to about 6 mm, from about 0.5 mm to about 5 mm, or from about 1 mm to about 3 mm. The width can be defined as the distance between the side of the bevel at the top surface of the plank to the side of the bevel at the side surface of the plank.

The system can comprise a dampener. The dampener can be adapted to dampen the movement of a guided cylinder and/or a guide shoe. The dampener can comprise, for example, a hydraulic dampener or a shock absorber. An exemplary dampener is the MC 600 MH available from Ace Controls, Farmington Hills, Mich. The movement of each guided cylinder can be independently or dependently dampened relative to the movement of one or more other guided cylinders in the system. The movement of each guided cylinder can be dampened in each of an extension direction and a retraction direction, wherein the extension direction is the direction of movement of the guided cylinder toward its position of maximum extension, and the retraction direction is the direction of movement of the guided cylinder toward its position of maximum retraction or minimum extension. Herein, such guided cylinders are also referred to as dually-dampened guided cylinders. In a dual-edge bevel-cut system, two dually-dampened guided cylinders can be used and, for example, controlled to independently cut two irregular bevel edges on a top surface of a plank.

Two identical dually-dampened guided cylinders can be used, with the exception that one of the cylinders can be modified so as to become a mirror image of the other. For example, if the dually-dampened guided cylinder has two pressure source lines operatively connected to a housing, and a pair of such dually-dampened guided cylinders are provided in the system, one of the dually-dampened guided cylinders can be modified such that the pressure source lines can be made to operatively connect to an opposite side of the housing. Thus, transposed, the modified dually-dampened guided cylinder can generally appear as a mirror image of the non-modified dually-dampened guided cylinder.

The system can comprise a mechanical stop adapted to control the movement of a guided cylinder and/or a guide shoe. A guide shoe can be used that is mounted or otherwise affixed to the guided cylinder. The hydraulic stop can be in contact with, and be adapted to function with, a dampener. Two hydraulic stops can be used with each guided cylinder, for example, to limit movement in an extension direction and to limit movement in a retraction direction.

The system can comprise at least one pressure regulator for each gas line used to control movement of the guided cylinder.

The system can comprise at least one flow regulator. The flow regulator can be adapted to control the amount of pressure applied to cause movement of a respective guided cylinder. Each flow regulator can comprise, for example, a one-way flow control valve. An exemplary one-way flow control valve is Part No. 162968 GRLA 1 4 QS 8 R S BG O available from Festo Corporation, Hauppauge, N.Y. A one-way flow control valve can regulate the airflow rate applied to a respective guided cylinder and can thus control the rate of movement of the guided cylinder. The flow regulator can control a rate of movement and/or an extent of movement of a guided cylinder, for example, to a maximum (extended) position, and to a minimum (retracted) position, and to continuously variable positions between the maximum position, and the minimum position.

The controller can be programmed such that movement of the guided cylinder between the maximum (extended) position and the minimum (retracted) position can be continuous, without stopping at any intermediate position. Likewise, the controller can be programmed such that movement of the guided cylinder from the minimum (retracted) position to the maximum (extended) position can be continuous, without stopping at any intermediate position.

A second valve can be used that is adapted to control the pressure source, for example, a solenoid valve. For example, the control valve can comprise a solenoid valve such as an MFH-5-1/4, Part No. 6211, available from Festo Corporation, Hauppauge, N.Y. The control valve can comprise a pressure intake port and one or more pressure output ports.

A method for creating one or more bevel edges on a plank is provided. The method can comprise moving one or more edges of a plank in a longitudinal direction and into contact with one or more cutting blades, for example, the cutting blades of two opposing bevel tools. The bevel tools can be maintained in a fixed position as the edges are simultaneously brought into contact with the cutting blades. The relative positions of the cutting blades and the plank edges can be controlled to form bevel-cuts in the edges. The plank can be moved up or down or back and forth in a linear direction that is normal to the longitudinal direction of movement of the plank. As such, the edges of the plank can be made to contact the cutting blades of the bevel tools. The up and down movement of the plank normal to the longitudinal direction can be controlled, for example, under control of a programmable controller, and can be controlled independently for each edge being bevel-cut.

The method can comprise controlling movement of a plank back and forth in a linear direction normal to a direction of plank advancement, under the control of a programmable controller. The programmable controller can comprise, for example, a program logic controller, such as a simatic programmable logic controller. An exemplary simatic programmable logic controller is available from Siemens Corporation, New York, N.Y. Independent programmable controllers can be used to independently control movement of two guided cylinders, and the guided cylinders control the movements of the edges of the plank.

The method can create an irregular bevel edge on a plank by varying the depth of a bevel-cut from a maximum depth to a minimum depth. The depth of the bevel-cut can be continuously varied between the maximum depth and the minimum depth. The bevel-cut can be maintained at a constant maximum depth and at a constant minimum depth. The depth of the bevel-cut can be changed at a rate of change. The rate of change between a maximum depth and a minimum depth can be, for example, from about 0.25 mm to about 3.0 mm over a plank edge length of about four inches. The rate of change of the bevel-cut depth can be from about 0.75 mm to about 2.25 mm per plank edge length of about four inches. The rate of change can be from about 1 mm to about 2 mm per plank edge length of about four inches.

The bevel-cut depth can remain about constant over a portion of the length of a plank. The bevel-cut depth can remain about constant at a maximum depth or at a minimum depth. The bevel-cut depth can remain about constant over a length of the plank of, for example, from about 0.1 inch to about 36 inches, from about 2 inches to about 24, or from about 4 inches to about 12 inches. The bevel-cut depth can remain constant for a length from of about 6 inches to about 10 inches of a plank.

A bevel-cutting system can comprise a user interface that allows an operator to activate and deactivate the system. A line operator can activate and deactivate the system. The controlling system can comprise open source programming that allows personnel to adjust the speed, duration, and/or frequency of the cut pattern.

The present invention also relates to methods that comprise creating irregular bevel edges. A programmable controller can be programmed to actuate an up and down or back and forth movement of one or more edges of a plank, in a direction normal to the longitudinal direction of advancement of the plank, so that the movement of each edge occurs at irregular intervals. The programmable controller can be programmed to actuate plank movement back and forth within a range of, for example, from about one cycle to about twelve cycles per four feet of plank, from about two cycles to about eight cycles per four feet of plank, or from about three cycles to about six cycles per four feet of plank. In some embodiments, the programmable controller can be pre-programmed.

The method can comprise creating irregular bevel edges, wherein a user can interface with a programmable controller to adjust the speed, duration, and/or frequency of a bevel-cut pattern for each edge. A plank can be moved in a linear direction in a range of from about 1 mm to about 10 mm, a range from of about 2 mm to about 6 mm, or a range of from about 3 mm to about 4 mm in each of the back and forth linear directions.

The method can comprise adapting two guided cylinders to move two edges of a plank back and forth in a linear direction normal to a longitudinal direction of advancement of a plank. Each guided cylinder can be moved by independently applying sufficient pressure to the guided cylinder to actuate the guided cylinder to move the plank. The pressure can be applied from, for example, a compressed gas source. The method can comprise independently controlling the amount of pressure to actuate movement of each respective guided cylinder. The amount of pressure can be controlled by a pressure regulator, for example, a one-way flow control valve. The method can comprise controlling the amount of pressure to actuate movement of each respective guided cylinder and thus control a rate of movement of the guided cylinder in a linear direction between a minimum position and a maximum position. The method can use a rate of movement of a guided cylinder that is controlled to generate an irregular bevel-cut pattern in a plank. The irregular bevel-cut pattern can resemble a sinusoidal cut profile.

The present invention also relates to a system for producing a plank, which can comprise a beveling station for creating a beveled edge on a plank and a cutting station for cutting at least one profile in an edge of the plank, to form a profiled plank. The system can comprise a conveyor adapted to convey a profiled plank from a cutting station to a beveling station or vice versa. The beveling station can comprise a beveling system for creating one or more irregular bevel edges on the plank, as described herein.

A system for producing a plank can comprise a line operation that comprises engaging and initiating profile cutting tools, initiating a transfer belt within a profiling machine, and feeding planks into the profiling machine. As a plank moves through the line operation, the plank can be cut to a finished overall width dimension. Then, a first profile cut can be generated in a first edge of the plank, and a second profile cut can be generated in a second edge of the plank, to generate a profiled plank. The line operation can then generate irregular bevel-cuts in the top edges of the profiled plank. Irregular bevel-cutting of the top two longitudinal edges can comprise two separate bevel-cutting operations. The profiled and bevel-cut plank can then be finish-cut to trim away any unbeveled edges from the plank.

The line speed of the plank production system can comprise a speed of from about 50 to about 200 meters per minute, for example, about 120 meters of plank per minute. At about 120 meters per minute, the beveling system can generate bevel-cuts at a rate of about 8 to about 10 cycles per second. Each bevel-cut can comprise a sloped acceleration/deceleration ramp for each bevel-cut cycle. The acceleration and deceleration ramps, however, do not have to be consistent or repeatable within each plank, and can vary. The bevel-cut pattern can be irregular and randomly generated.

The system can create a bevel edge on a plank, which varies in width. The bevel edge width can range, for example, from about 0 mm to about 6 mm, from about 0.5 mm to about 5 mm, or from about 1 mm to about 3 mm. The width can be defined as the distance between the side of the bevel at the top surface of the plank to the side of the bevel at the side surface of the plank. One or more planks can have variable bevel edge widths along the length of the bevel edge(s), such as a plank having bevel edge(s) with a portion of the bevel edge width have one, two, three, or four or more of the following width ranges in a single or plurality of planks:

a) 0.1 mm to 0.5 mm
b) 0.6 mm to 1 mm;
c) 1.1 mm to 1.5 mm;
d) 1.6 mm to 2 mm;
e) 2.1 mm to 2.5 mm;
f) 2.6 mm to 3 mm;
g) 3.1 mm to 3.5 mm;
h) 3.6 mm to 4 mm;
i) 4.1 mm to 4.5 mm;
j) 4.6 mm to 5 mm;
k) 5.1 mm to 5.5 mm;
l) 5.6 mm to 6 mm;
m) Over 6 mm.

So, for example, a plank can have a bevel edge with a length, and in the length, there can be one or more portions that have a width of a) above, one or more portions that have a width of b) above, one or more portions that have a width of c) above, one or more portions that have a width of d) above, one or more portions that have a width of e) above, one or more portions that have a width of f) above, one or more portions that have a width of g) above, one or more portions that have a width of h) above, one or more portions that have a width of i) above, one or more portions that have a width of j) above, one or more portions that have a width of k) above, one or more portions that have a width of l) above, and/or one or more portions that have a width of m) above. Any combination of widths in a plank bevel edge can be present. Any number of combinations are possible, and the length can have just 2 of any of a)-m), 3 of any of a)-m), 4 of any of a)-m), 5 of any of a)-m), and so on. Further, the bevel edge can be present on one edge, two edges, three edges, four edges, and/or can be present on false edges located on a plank.

In more detail, and with reference to the attached drawing figures, the figures show various aspects of several embodiments of the present invention.

FIGS. 1-4B represent schematic diagrams of various views of an apparatus used in embodiments of a beveling system. As shown in FIGS. 1-4B, a guided cylinder unit 10 comprises cylinder guides 12 and 13, drive cylinder 15, and top yoke 41. A solenoid valve 16 controls the delivery of positive air pressure between output ports 18 and 20. Flow control valves 24 and 26 regulate the flow of air applied to guided cylinder unit 10. A pressure source directs compressed air through input port 28. Pneumatic mufflers 30 reduce noise at the solenoid valve exhaust ports and filter debris from entering solenoid valve 16.

Guided cylinder unit 10 and solenoid valve 16 are mounted to a mounting shoe plate 32. Solenoid 16 is mounted to mounting shoe plate 32 using bolts 33. Guided cylinder unit 10 is mounted to mounting shoe plate 32 using bolts 39.

Figure 2:
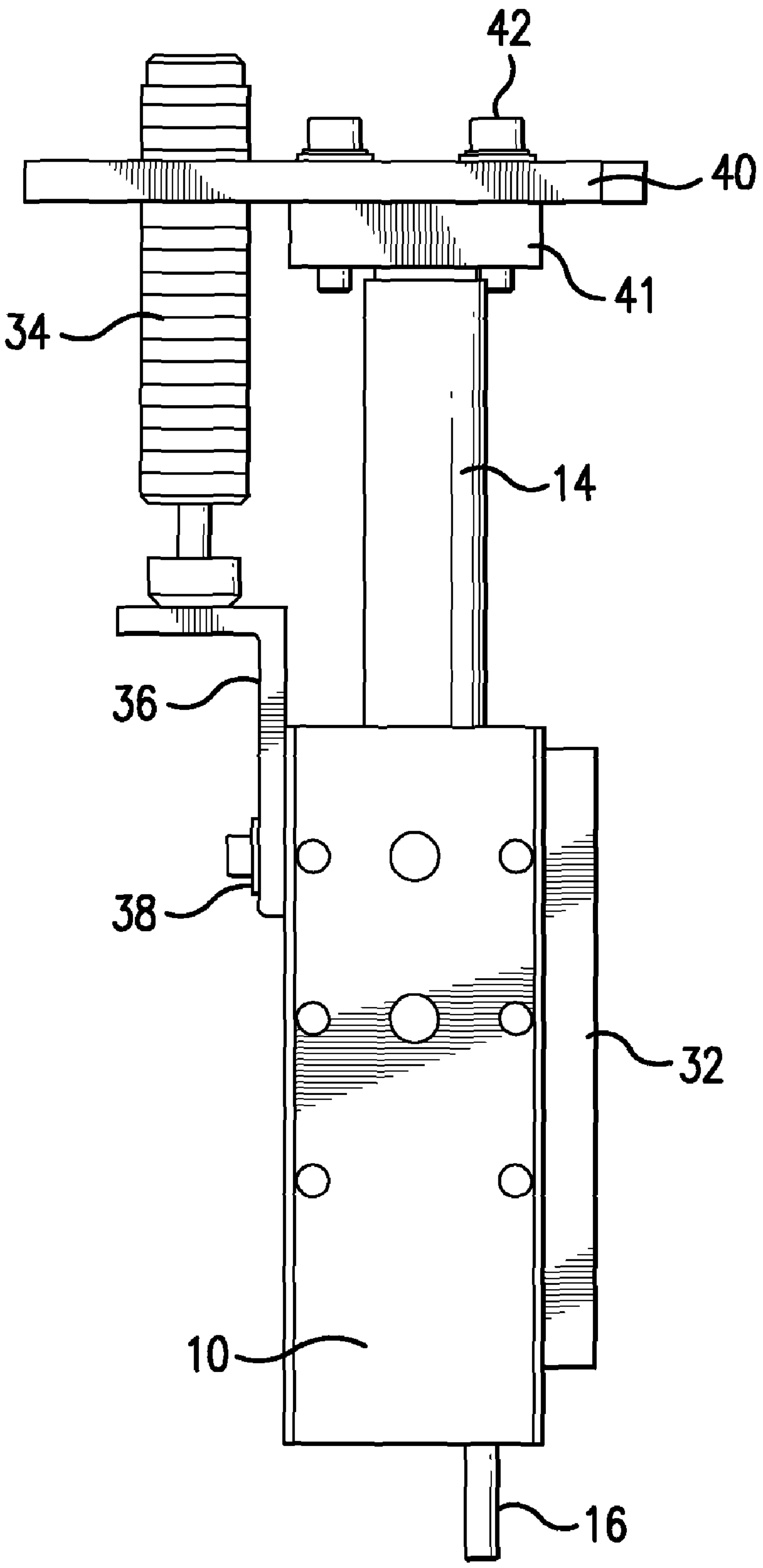
FIG. 2 is a side view of the apparatus shown in FIG. 1.
Figure 3:
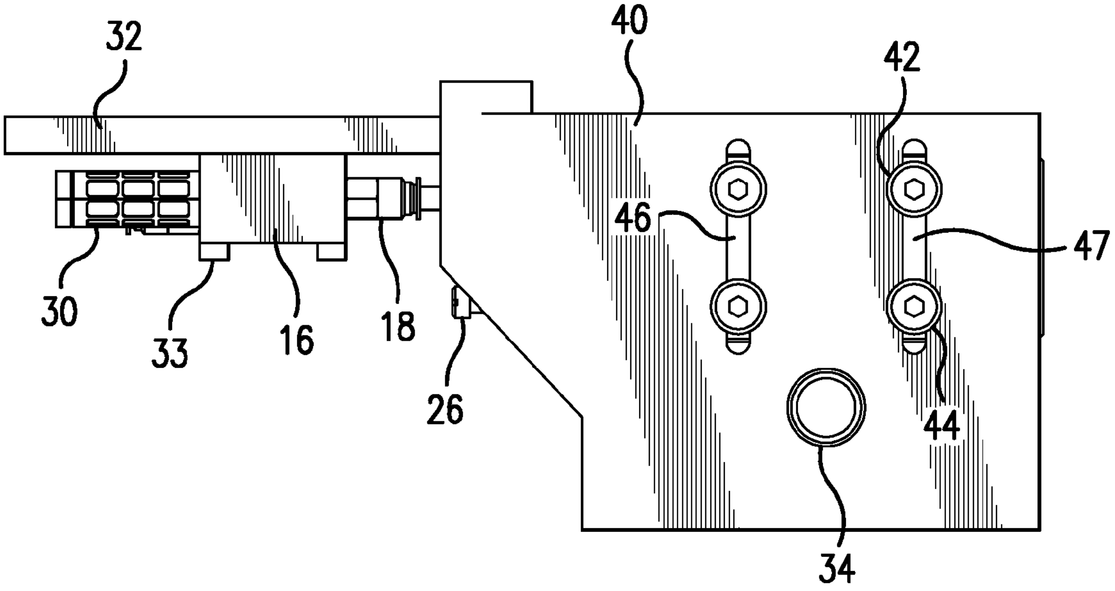
FIG. 3 is a top view of the apparatus shown in FIG. 1.
Figure 4A:
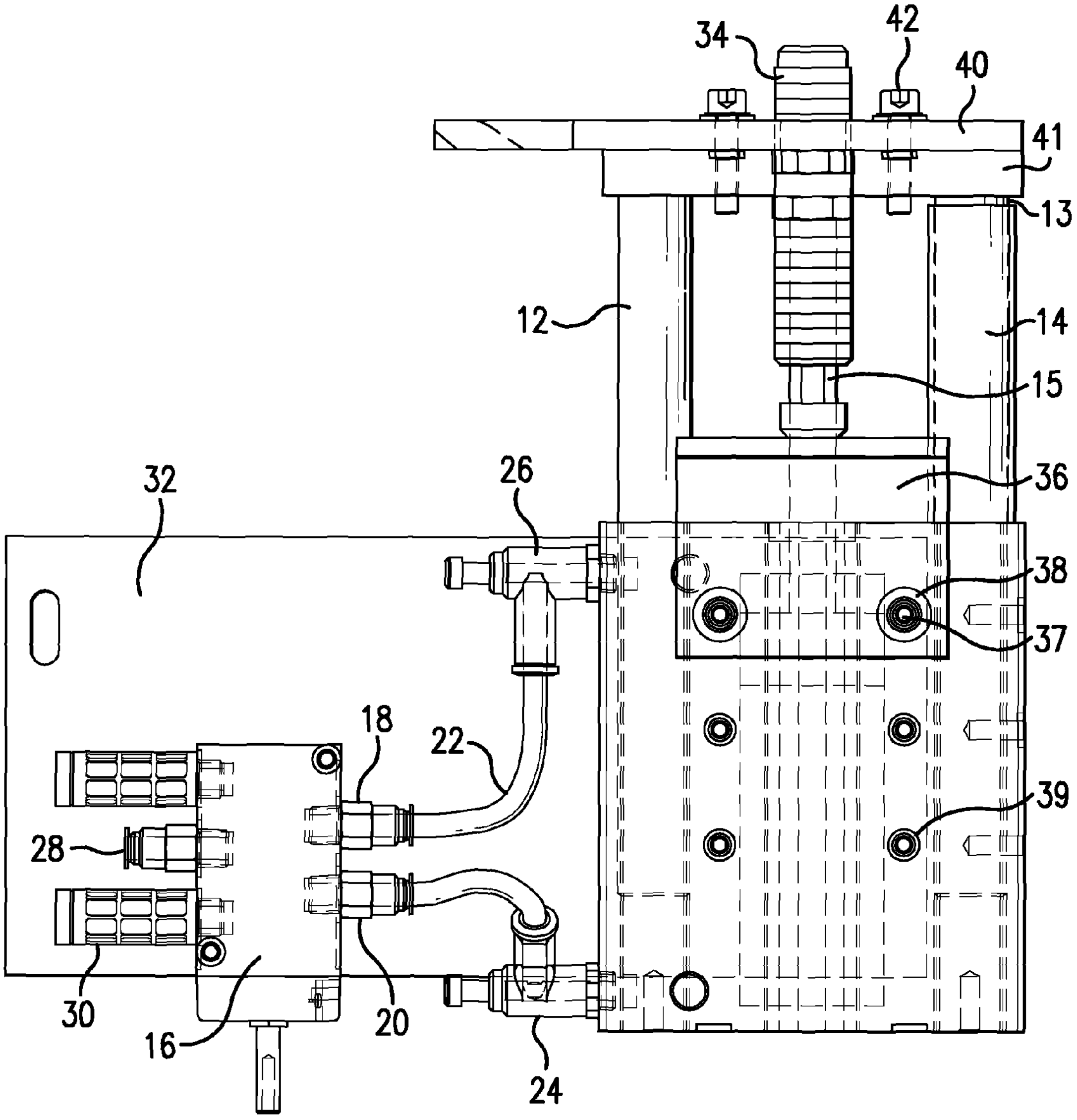
FIG. 4A is a front view in partial phantom of the apparatus shown in FIG. 1.
Figure 4B:
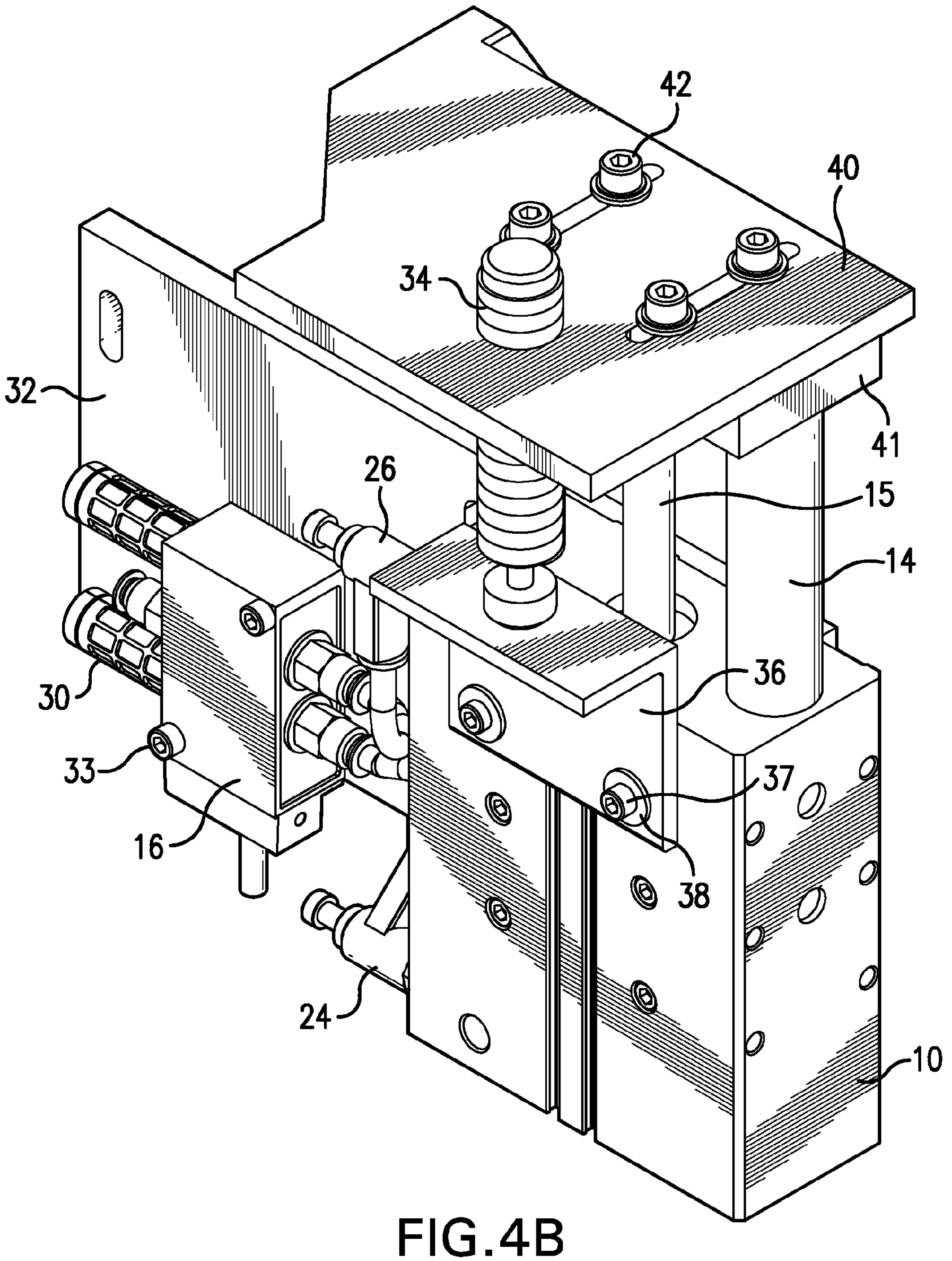
FIG. 4B is a perspective view of the apparatus shown in FIG. 1.

Guided cylinder unit 10 comprises a stroke limiter 14, as shown in FIGS. 1 and 2. Stroke limiter 14 can comprise a pipe that fits around cylinder guide 13. Stroke limiter 14 has a shorter length than cylinder guide 13, thus leaving a gap between stroke limiter 14 and top yoke 41. The size of the gap shown in FIGS. 1 and 2 corresponds to the distance traveled by guided cylinder unit 10 between a minimum (retracted) position and a maximum (extended) position.

Guided cylinder unit 10 further comprises a guide shoe 40 (FIG. 2) mounted to top yoke 41. Guide shoe 40 is mounted to top yoke 41 using bolts 42 and internal tooth lock washers 44. Guide shoe 40 comprises adjustment slots 46 and 47 for positioning guide shoe 40 on top yoke 41. A dampener or shock absorber 34 is threaded through guide shoe 40 and is in contact with a hydraulic stop 36. Hydraulic stop 36 is attached to guided cylinder unit 10 using bolts 37 and washers 38.

Figure 5A:
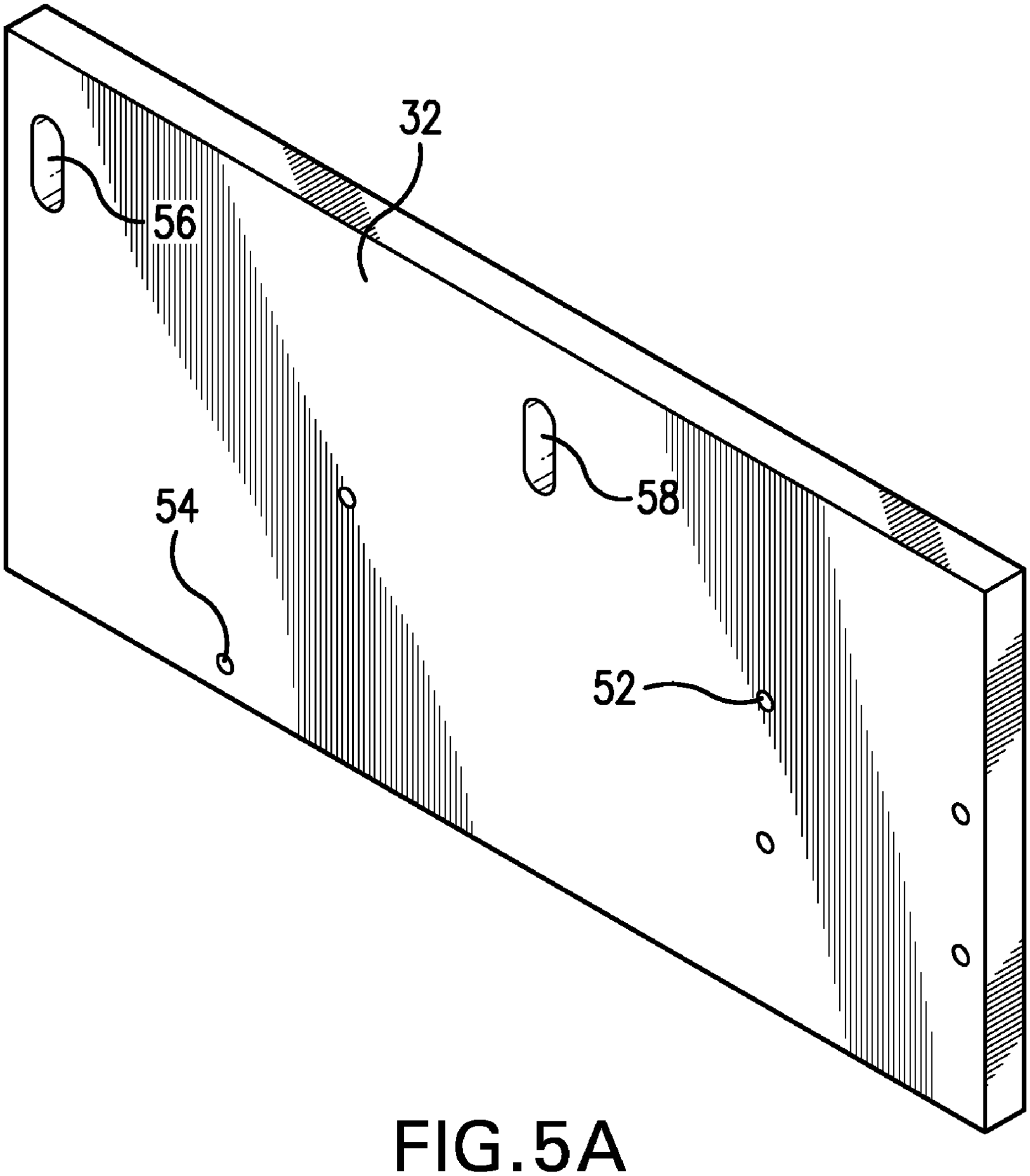
FIG. 5A is a perspective view of a mounting shoe for a beveling system, according to various embodiments of the present invention.
Figure 5B:
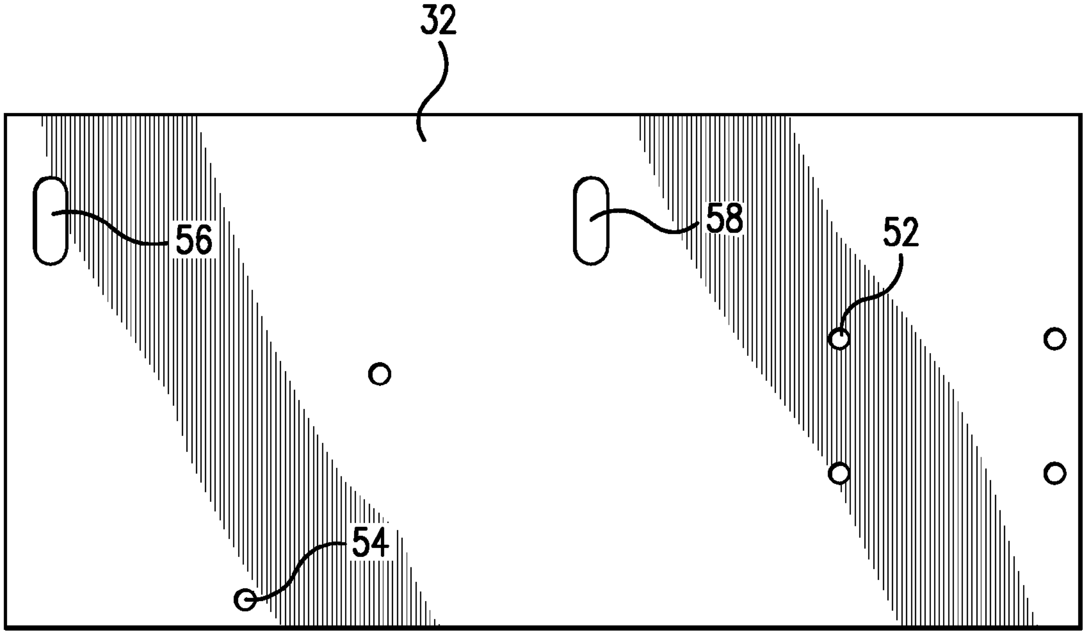
FIG. 5B is a front view of the mounting shoe shown in FIG. 5A.

As shown in FIG. 5A and FIG. 5B, mounting shoe plate 32 comprises threaded holes 52 for positioning and attaching guided cylinder unit 10. Mounting shoe plate 32 also comprises threaded holes 54 for positioning and attaching solenoid valve 16. Mounting shoe plate 32 further comprises adjustment slots 56 and 58 for positioning and adjusting the plank movement apparatus within a beveling system.

Figure 6A:
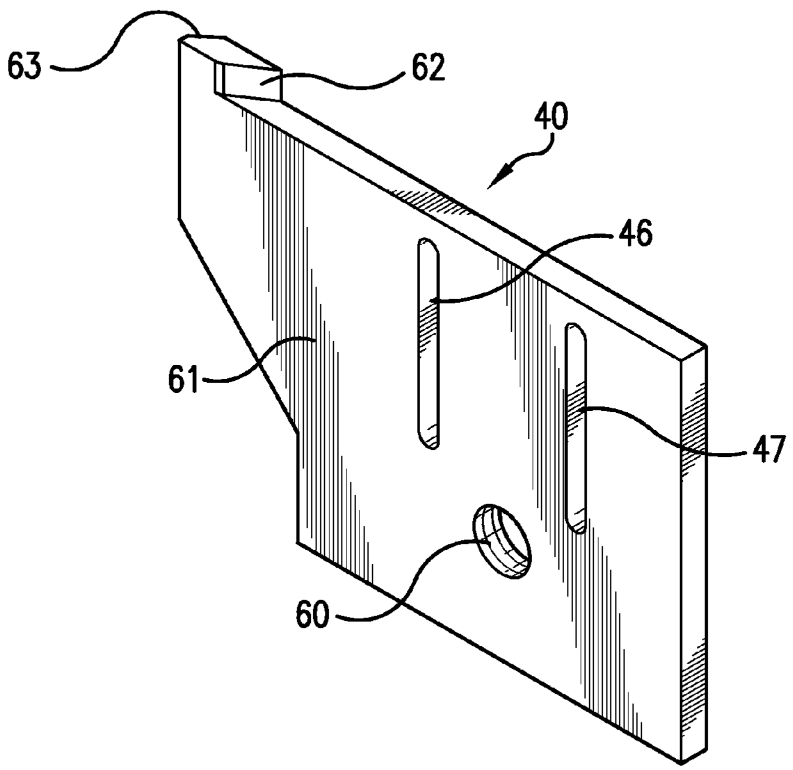
FIG. 6A is a perspective view of an embodiment of a guide shoe for a beveling system, according to various embodiments of the present invention.
Figure 6B:
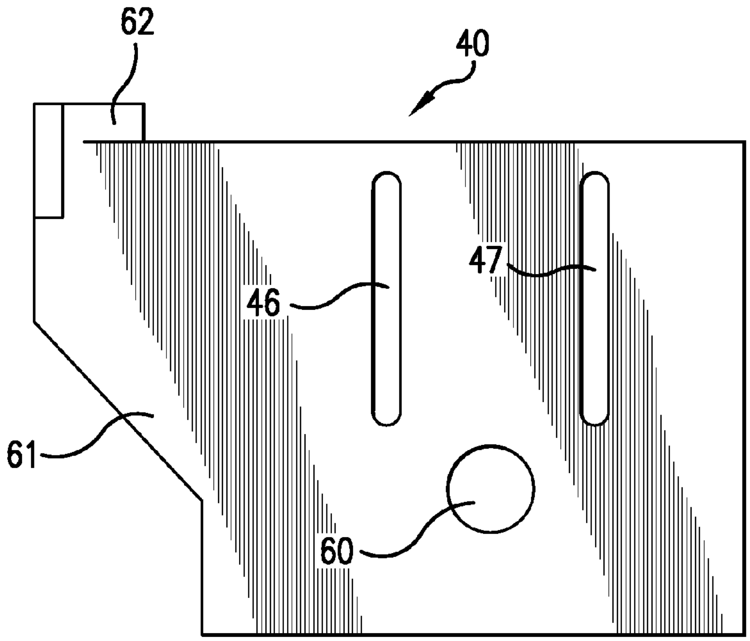
FIG. 6B is a top view of the guide shoe shown in FIG. 6A.
Figure 6C:
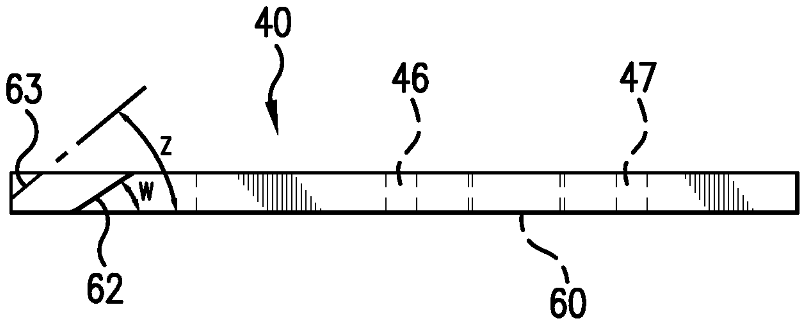
FIG. 6C is a side view of the guide shoe shown in FIG. 6A.
Figure 6D:
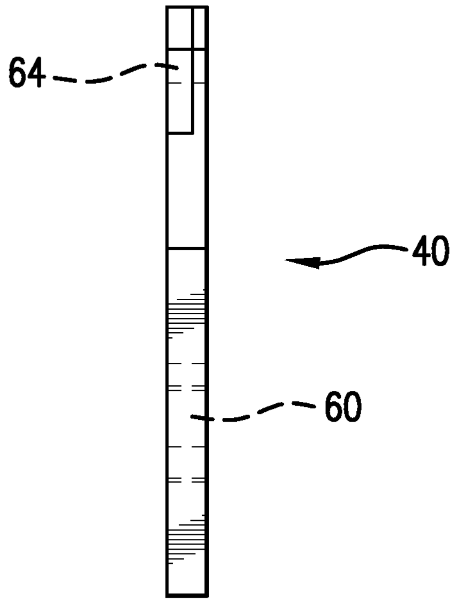
FIG. 6D is a side edge view of the guide shoe shown in FIG. 6A.
Figure 7A:
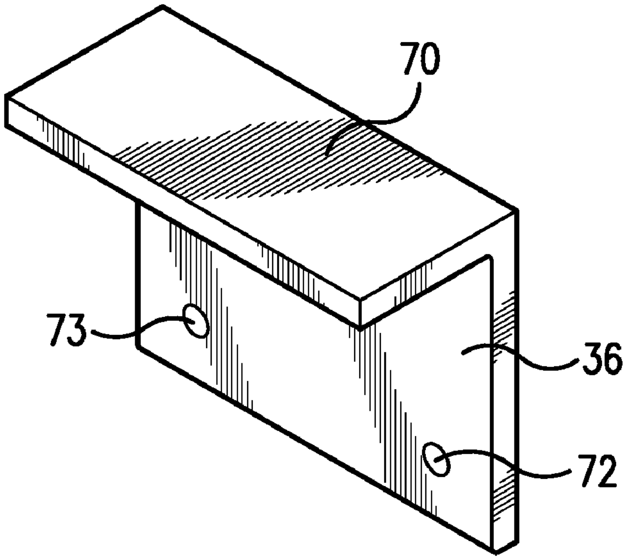
FIG. 7A is a perspective view of a hydraulic stop for a beveling system, according to various embodiments of the present invention.
Figure 7B:
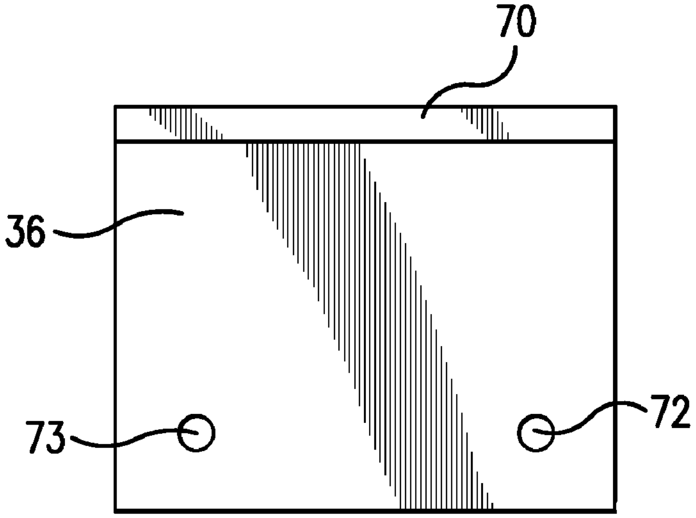
FIG. 7B is a side view of the hydraulic stop shown in FIG. 7A.
Figure 7C:
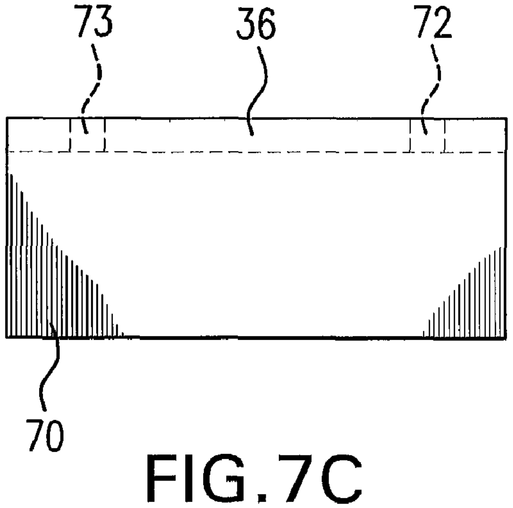
FIG. 7C is a top view of the hydraulic stop shown in FIG. 7C.
Figure 7D:
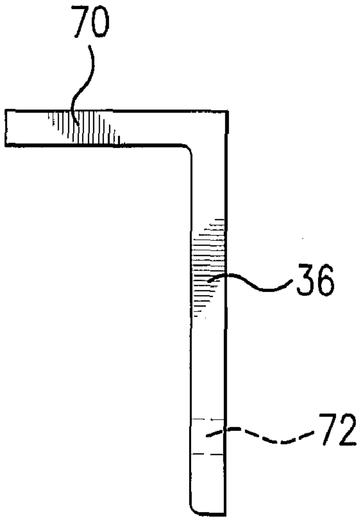
FIG. 7D is a side view of the hydraulic stop shown in FIG. 7D.

As shown in FIGS. 6A, 6B, 6C, and 6D, guide shoe 40 comprises adjustment slots 46 and 47. Guide shoe 40 further comprises a threaded opening 60 for attaching dampener or shock absorber 34. Guide shoe 40 comprises a flat main surface 61 and an angled lip portion 62. Angled lip portion 62 features a surface cut at an angle W, as shown in FIG. 6C. The angled lip can help guide and position a plank to make a desired contact with a bevel-cutting tool. Guide shoe 40 comprises a cut away portion 63 that provides clearance space for a bevel-cutting tool. Cut away portion 63 is cut at an angle Z as shown in FIG. 6C.

As shown in FIGS. 7A, 7B, 7C, and 7D, hydraulic stop 36 has an L-shaped cross-sectional configuration including a top face 70. Hydraulic stop 36 comprises mounting holes 72 and 73. The mounting holes allow mounting and positioning of hydraulic stop 36 to guided cylinder unit 10. Preferably, hydraulic stop 36 comprises a material having high strength, for example, steel, titanium, or aluminum.

Figure 8:
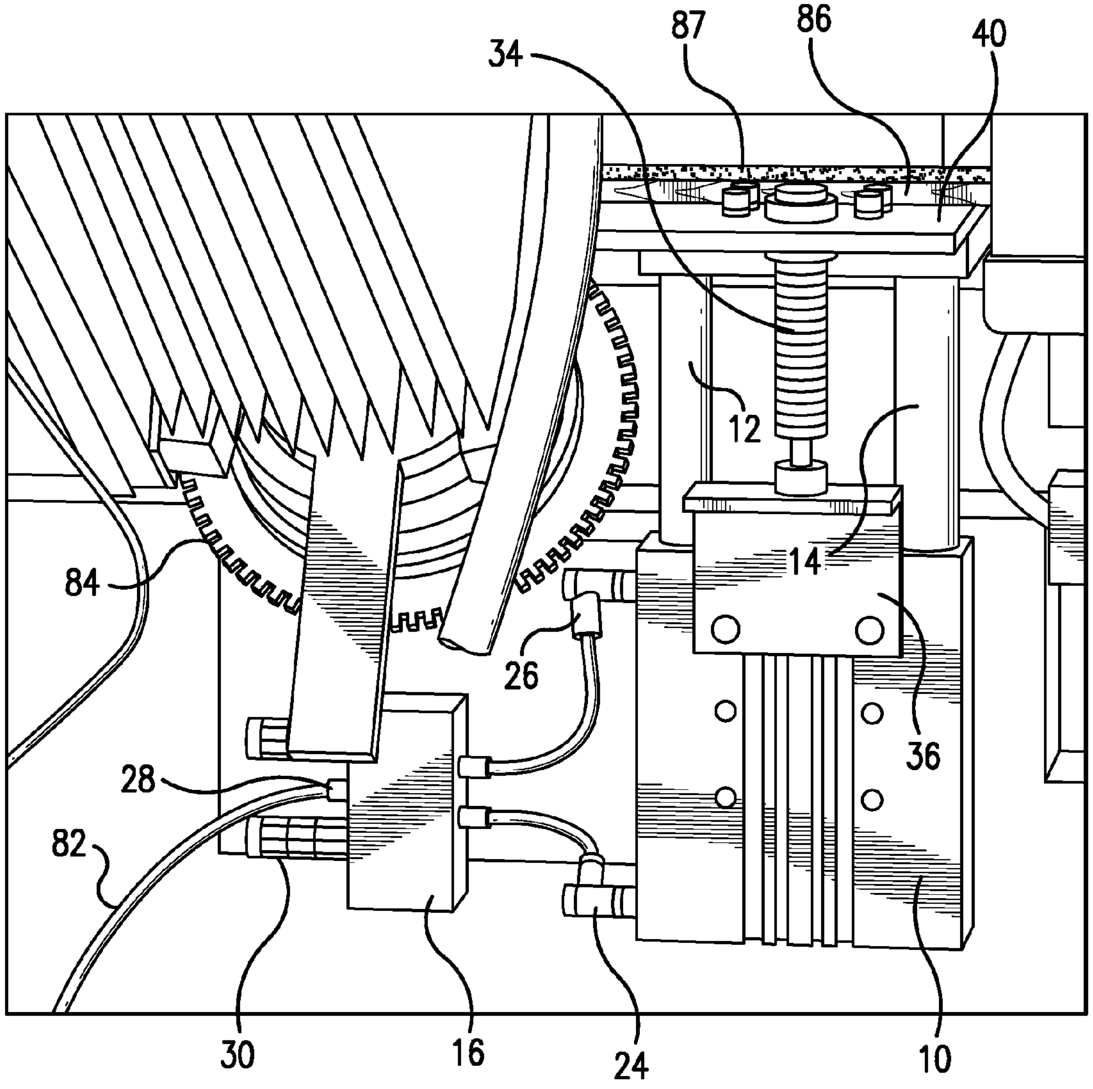
FIG. 8 is a perspective view of a beveling system according to various embodiments of the present invention.
Figure 9:
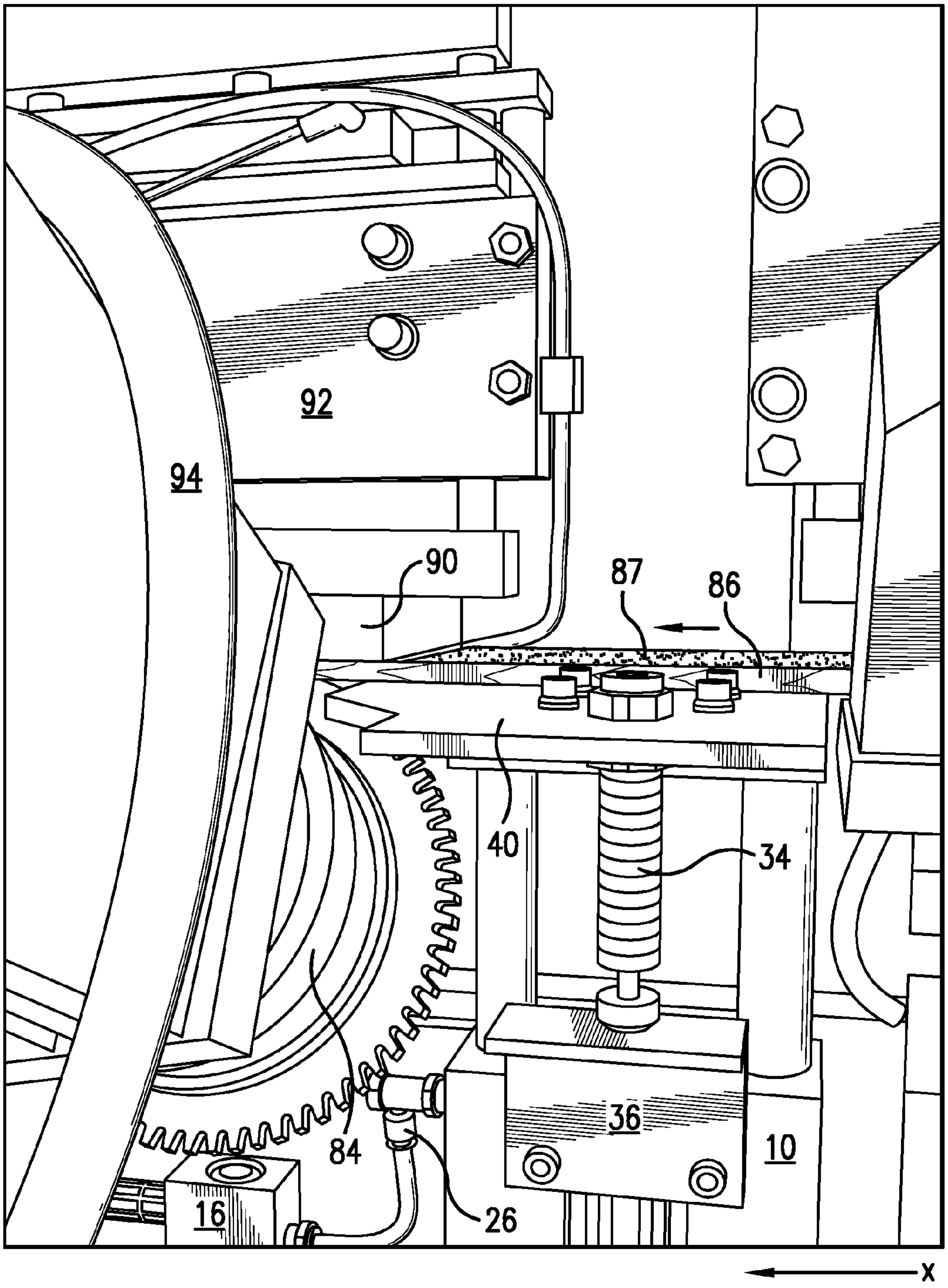
FIG. 9 is an enlarged view of a portion of the beveling system shown in FIG. 8.

Referring to FIGS. 8 and 9, embodiments of a beveling system for creating a bevel edge on a plank are shown. As shown in FIG. 8, a gas input line 82 supplies gas pressure to solenoid valve 16. Solenoid valve 16 directs the gas pressure to control valves 24 and 26. Air pressure flows through control valves 24 or 26 to guided cylinder unit 10. The cutting blade of a bevel-cutting tool 84 is positioned adjacent guided cylinder unit 10. In the embodiment shown, bevel-cutting tool 84 is fixed in position and configured for rotation of the cutting blade. Second guide shoe 40 is in contact with an edge of a plank 86, and plank 86 is positioned above bevel-cutting tool 84. In this embodiment, plank 86 is positioned such that a top face of the plank is in contact with a steel transfer belt (not seen) and an edge of plank 86 is in contact with the second guide shoe 40. The bottom face of plank 86 is in contact with an overhead rubber conveyor belt 87 that is pressed against the bottom face of plank 86 by first guide shoe 90. The top face of plank 86 will be in contact with, and be cut by, the cutting blade of bevel-cutting tool 84.

Referring to FIG. 9, plank 86 is delivered on a steel transfer belt (not seen), top face down, in a longitudinal direction moving toward bevel-cutting tool 84. Hold down compression is applied from overhead rubber belt 87 and first guide shoe 90. The longitudinal direction of plank 86 is shown in FIG. 9 by the directional arrow shown adjacent conveyer belt 87. First guide shoe 90 comprises at least one roller (not shown) to allow the longitudinal movement of plank 86. Biasing device 92 is configured to bias first guide shoe 90 in a direction toward second guide shoe 40. A power cord is encased inside a protective cover 94.

Air pressure passing through control valve 26 to guided cylinder unit 10 actuates drive piston 15 (hidden from view in FIGS. 8 and 9 behind shock absorber 34) to move second guide shoe 40 in a vertical direction. Relying on compressibility of rubber belt 87 and first guide shoe 90, plank 86 is forced upward and out of the bevel-cut by guided cylinder 10 and second guide shoe 40. The general vertical directions are shown by arrow y, and the general longitudinal direction is shown by arrow x, in FIG. 9.

When drive piston 15 extends upward, second guide shoe 40 guides plank 86 away from bevel-cutting tool 84. When solenoid valve 16 reverses the air pressure flow to guided cylinder unit 10, drive piston 15 retracts to move second guide shoe 40 downward in a vertical direction y. Second guide shoe 40, in combination with first guide shoe 90, guides plank 86 toward and away from the cutting blade of bevel-cutting tool 84.

As described above, the retraction of guided cylinder unit 10 and the retraction of second guide shoe 40 are limited by hydraulic stop 14. The retraction of second guide shoe 40 is consequently limited to the difference in length between cylinder guide 13 and hydraulic stop 14, and the amount of gap space between the top of hydraulic stop 14 and top yoke 41.

When guided cylinder unit 10 is fully retracted, plank 86 is in maximum contact with the cutting blade of bevel-cutting tool 84. At this point, the maximum bevel depth is cut. When guided cylinder unit 10 is fully extended, plank 86 is in minimum contact with the cutting blade of bevel-cutting tool 84, and a minimum bevel depth is cut.

Flow control valve 24 and 26 can control the rate at which guided cylinder unit 10 moves between the positions of full extension and full retraction. The extension and retraction rate is further influenced by the amount of pressure applied by first guide shoe 90 and biasing device 92. The extension and retraction rate is further influenced by shock absorber 34, in combination with hydraulic stop 36.

Shock absorber 34 also dampens the downward movement of second guide shoe 40. This serves to reduce stress on the system components, in particular, the components of guided cylinder unit 10.

Figure 10:
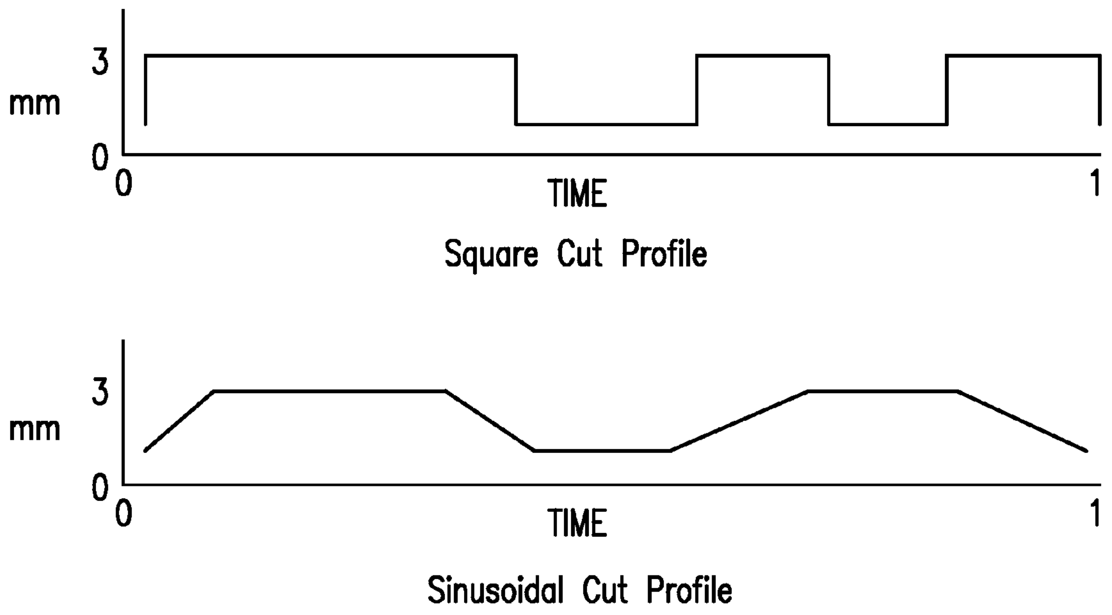
FIG. 10 is a graphical representation showing the depth of bevel-cut over time of a square cut profile and of a randomly generated sinusoidal cut profile.
Figure 11:
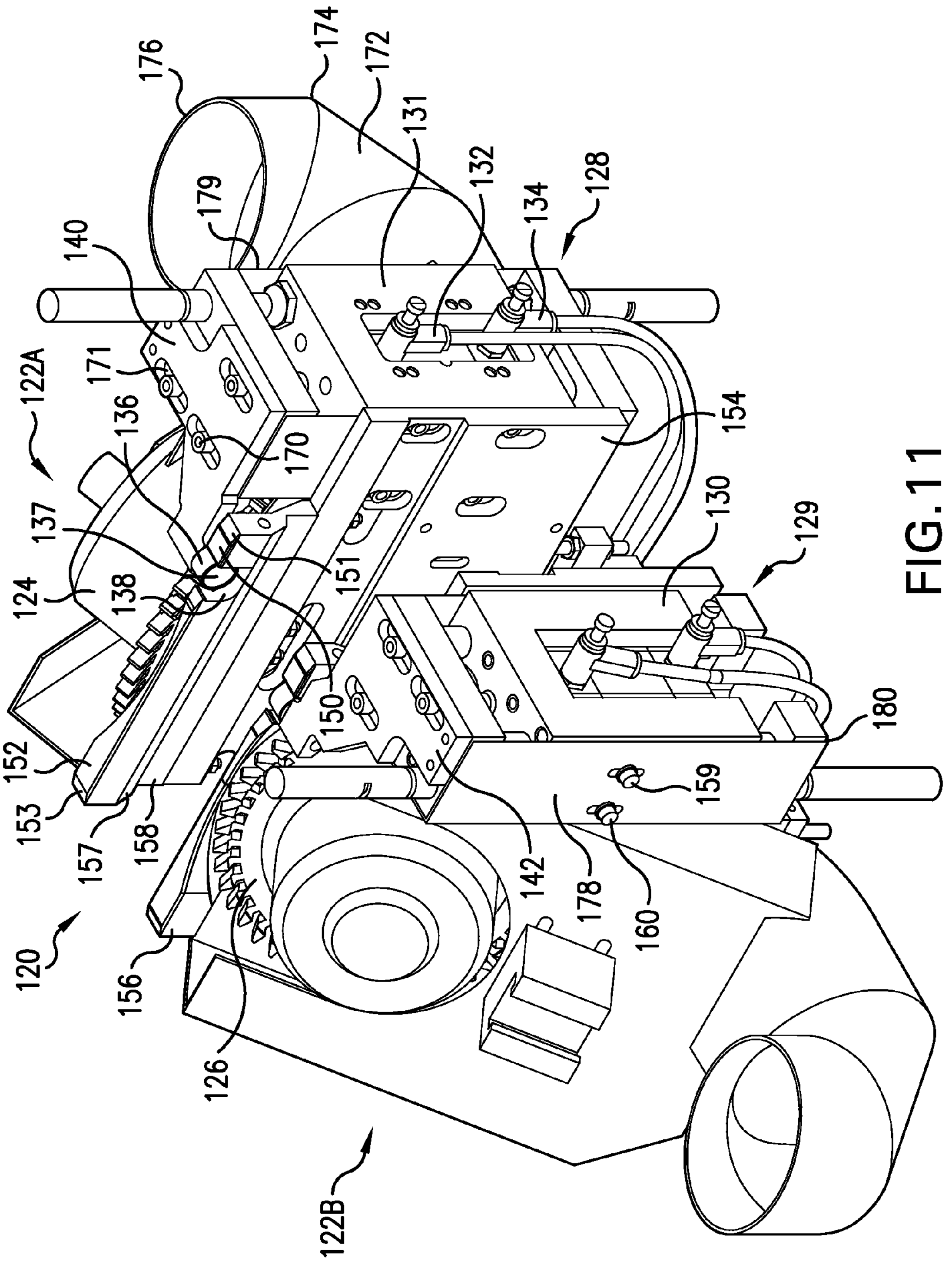
FIG. 11 is a perspective view of a dual-edge irregular bevel-cut system according to various embodiments of the present invention.
Figure 12:
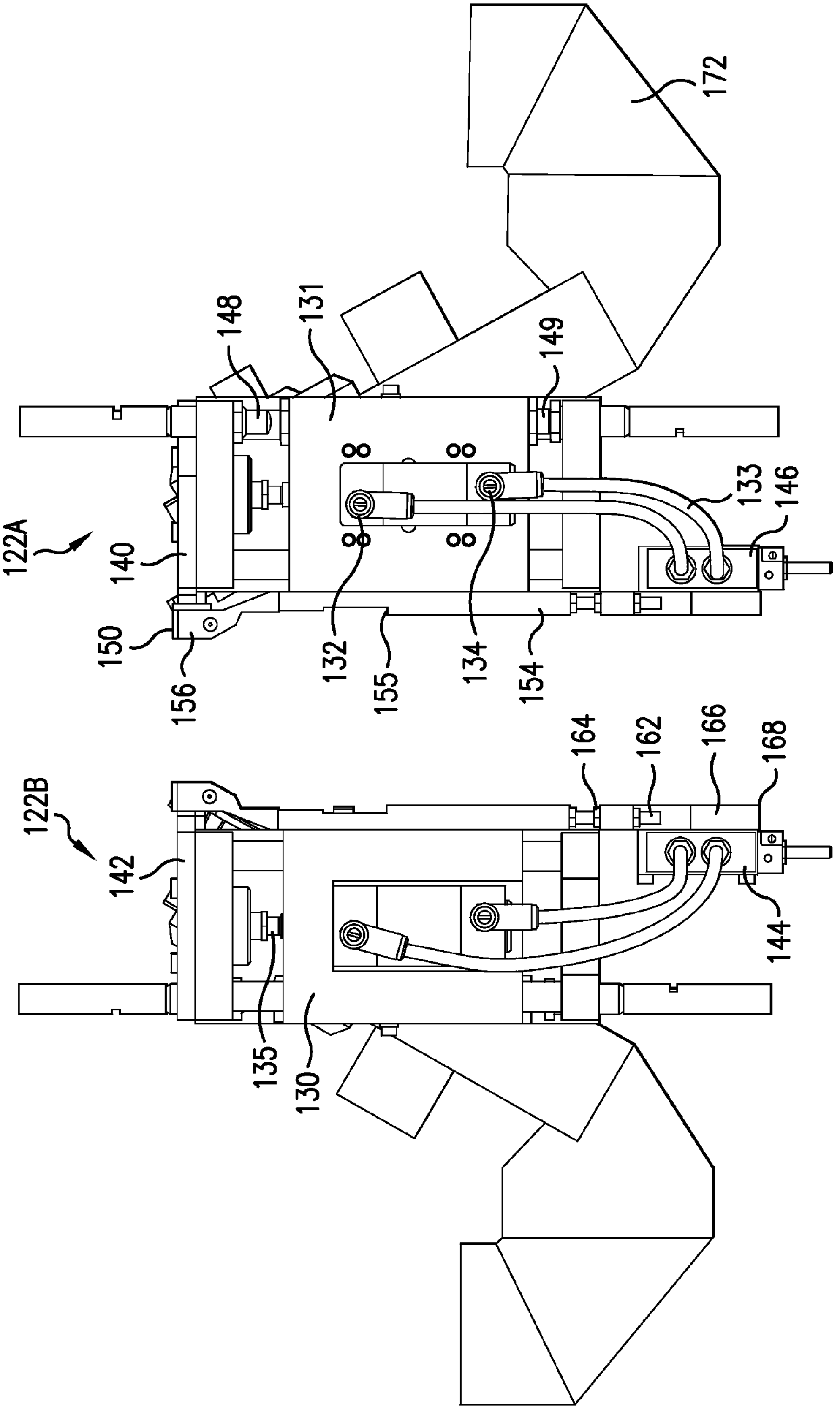
FIG. 12 is a first end view of the apparatus shown in FIG. 11.

The irregular bevel-cut pattern can resemble a generally sinusoidal cut profile, as shown in FIG. 10. The movement of a guided cylinder between a minimum position (retracted) and a maximum position (extended) occurs over a desired interval of time. In FIG. 10, the guided cylinder moves from a fully retracted position to a 3 mm fully extended position over a first time interval, then maintains that 3 mm extended position for a second time interval, and then moves to a fully retracted position over a third time interval, to reflect a smooth sinusoidal transition between the retracted and extended positions. As shown in FIG. 10, the guided cylinder then remains fully retracted for a fourth period of time, extends again over a fifth period of time, remains fully extended over a sixth period of time, and then again fully retracts over a seventh period of time. This sinusoidal cut profile is in contrast to the sharp, square cut profile shown in FIG. 10 that does not exhibit a positive or negative rate of change between extended and retracted positions.

In a bevel-cutting system of the present invention, for example, the embodiments described above and illustrated with reference to FIGS. 8 and 9, when guided cylinder 10 is in a fully retracted position, plank 86 is in maximum contact with bevel-cutting tool 84, and a maximum bevel width is cut. When guided cylinder 10 transitions to a fully extended position, plank 86 moves away from contact with bevel-cutting tool 84, decreasing the bevel-cut width. A random cut pattern resembling a sinusoidal function, with smooth transitions between bevel-cut widths produces a desired appearance of a randomly generated, hand-scraped bevel.

FIGS. 11-17 represent schematic diagrams of various views of an apparatus that can be used in a dual-edge bevel-cut system. Referring to FIGS. 11-17, apparatus 120 can comprise two units 122A and 122B that are essentially mirror images of each other. Apparatus 120 comprises one or more bevel tools 124 and 126. Each unit 122A and 122B further comprises a servomechanism 128 and 129 positioned adjacent each bevel tool 124 and 126. Servomechanism 128 and/or 129 can comprise, for example, a pneumatic servomechanism. Servomechanism 128 and/or 129 can move a plank 182 in a linear direction toward, against, and away from, a cutting blade of beveling tool 124 and/or 126. Each servomechanism 128 and 129 can comprise a guided cylinder 130 or a modified guided cylinder 131. Guided cylinder 130, and/or modified guided cylinder 131, can each comprise, for example, a Festo-guided gas cylinder. Modified guided cylinder 131 comprises a guided cylinder that has been modified to become a mirror image of guided cylinder 130. For example, modified guided cylinder 131 has two flow control valves 132 and 134 that are operatively connected to the opposite side of the guided cylinder housing than guided cylinder 130.

Apparatus 120 comprises flow control valves 132 and 134, each adapted to control a pressure source (not shown) to actuate movement of guided cylinder 130 and/or modified guided cylinder 131. Flow control valves 132 and 134 can comprise, for example, a one-way flow control valve available, for example, from Festo Corporation, Hauppauge, N.Y. Flow control valves 132 and 134 can regulate the flow of gas applied to guided cylinder unit 130 and/or modified guided cylinder 131.

Apparatus 120 further comprises a first guide shoe 140 and a third guide shoe 142. First guide shoe 140 and/or third guide shoe 142 is mounted to guided cylinder 130 and/or modified guided cylinder 131 using one or more forged socket head cap screw 170. First guide shoe 140 and third guide shoe 142 comprise one or more adjustment slot 171 for position adjustment.

Apparatus 120 further comprises a roller bearing 136. Roller bearing 136 can comprise, for example, a stainless steel bearing, a hardened steel bearing, a tungsten carbide bearing, and/or a titanium carbide bearing. Roller bearing 136 can rotate around a bearing 137. Bearing 137 can comprise, for example, a McGill cam follower bearing. Apparatus 120 further comprises a recess 138 that at least partially accommodates roller bearing 136. An adjustment mechanism (not shown) can be utilized to adjust the position of roller bearing 136 in recess 137. For example, roller bearing 136 can be adjusted to a fully recessed position.

Apparatus 120 further comprises one or more solenoid valves 144 and 146 adapted to control the delivery of positive pressure from the pressure source to flow control valves 132 and 134, and guided cylinder 130, and/or modified guided cylinder 131.

Apparatus 120 further comprises one or more dampeners 148 and 149 adapted to dampen the movement of modified guided cylinder 131 and/or guided cylinder 130. Dampeners 148 and 149 can dampen the movement of modified guided cylinder 131 and/or guided cylinder 130 in each of an extension direction and a withdrawal/retraction direction.

Apparatus 120 further comprises a stationary guide 150, and a stationary guide 152. Stationary guides 150 and 152 can comprise, for example, tungsten carbide, and/or titanium carbide. Stationary guide 150 further comprises a lead-in portion 151. Stationary guide 152 further comprises a guide groove 153.

Apparatus 120 further comprises a lower support 154, and an upper support 156. Lower support 154 comprises a lower support groove 155, and upper support 156 comprises an upper support groove 157 and an upper support groove 158. Apparatus 120 further comprises a lower shoe support 166. Lower shoe support 166 is attached to lower support 154 utilizing, for example, one or more threaded screw 162 and hex jam nut 164. Lower shoe support 166 comprises a lower shoe support groove 168.

Apparatus 120 further comprises a cylinder shield 178, positioned to at least partially enclose guided cylinder 130 and/or modified guided cylinder 131. Cylinder shield 178 can be mounted to guided cylinder 130 using, for example, one or more forged socket head cap screw 159 and helical spring lock washer 160. Cylinder shield 178 further comprises a cylinder shield groove 179 and a cylinder shield groove 180.

Apparatus 120 further comprises a dust hood 172. Dust hood 172 comprises a dust hood side seam 174 and a dust hood side seam groove 176.

Referring again to FIGS. 11-17, dual-edge bevel-cut systems for creating bevel edges on a plank are shown. A gas input line (not shown) supplies gas pressure to solenoid valve 146. Solenoid valve 146 directs the gas pressure to control valves 132 and 134. Gas pressure flows through control valves 132 and/or 134 to modified guided cylinder unit 131. The cutting blade of bevel-cutting tool 124 is positioned adjacent modified guided cylinder unit 131. In the embodiment shown, bevel-cutting tool 124 is fixed in position and configured for rotation of the cutting blade. Roller bearing 136 is in contact with an edge of a plank 182, and plank 182 is positioned above bevel-cutting tool 124. In this embodiment, plank 182 is positioned such that a top face of the plank is in contact with a steel transfer belt (not seen) and an edge of the plank is in contact with first guide shoe 140. The bottom face of plank 182 is in contact with an overhead rubber conveyor belt (not seen) that is pressed against the bottom face of the plank by a second guide shoe (not seen). The top face of plank 182 will be in contact with, and be cut by, the cutting blade of bevel-cutting tool 124.

Figure 13:
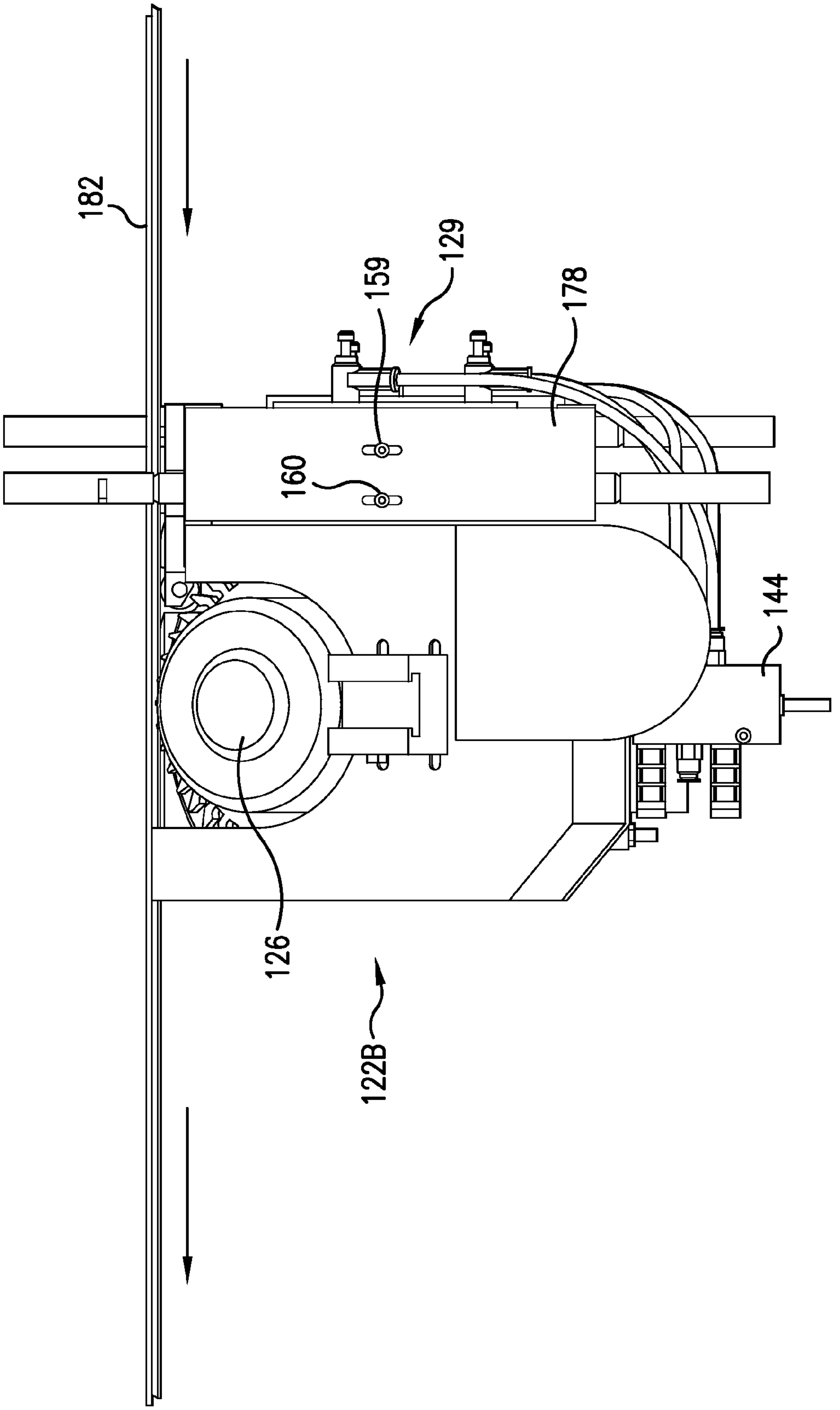
FIG. 13 is a first side view of the apparatus shown in FIG. 11.
Figure 14:
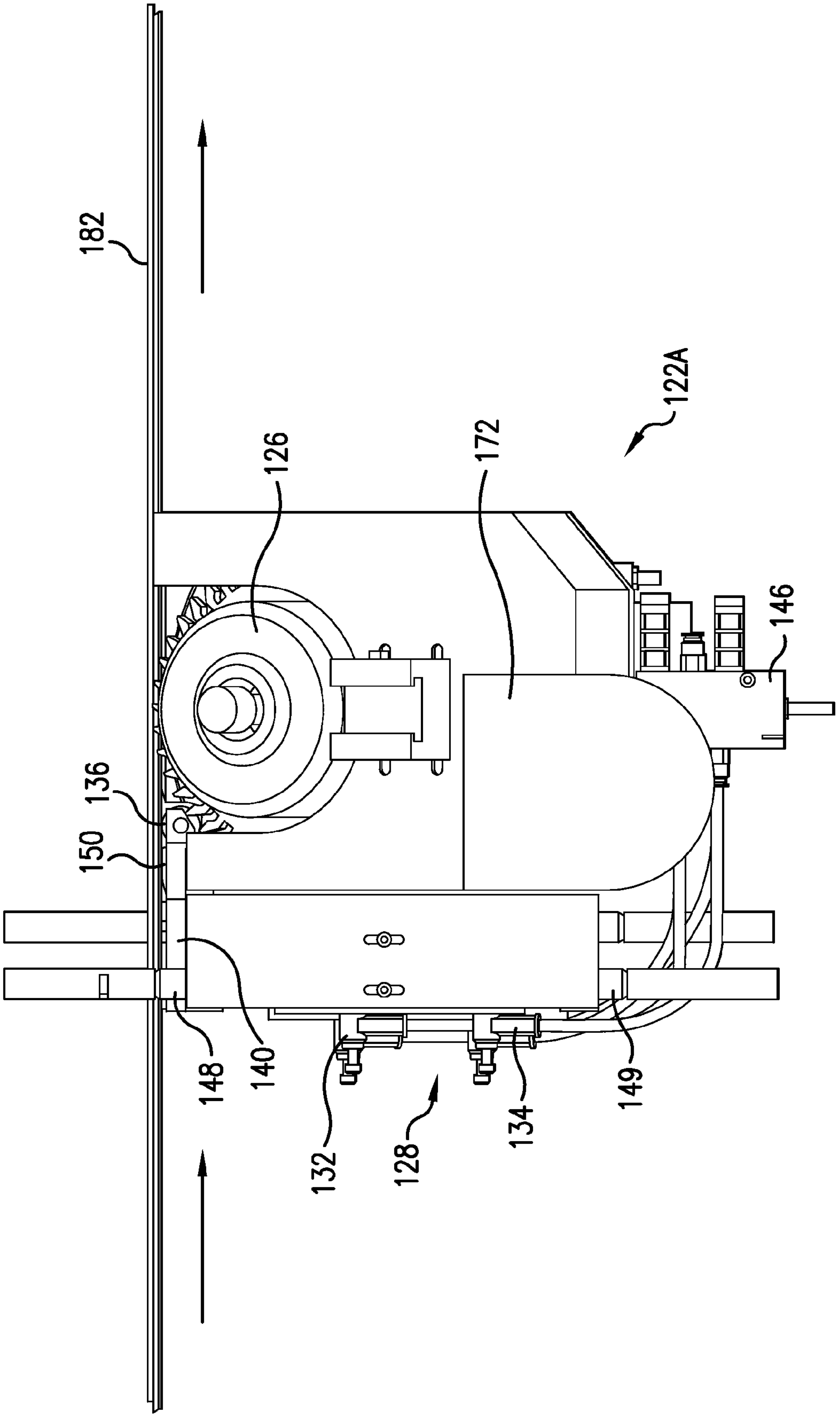
FIG. 14 is a second side view of the apparatus shown in FIG. 1, opposite the view shown in FIG. 13.
Figure 15:
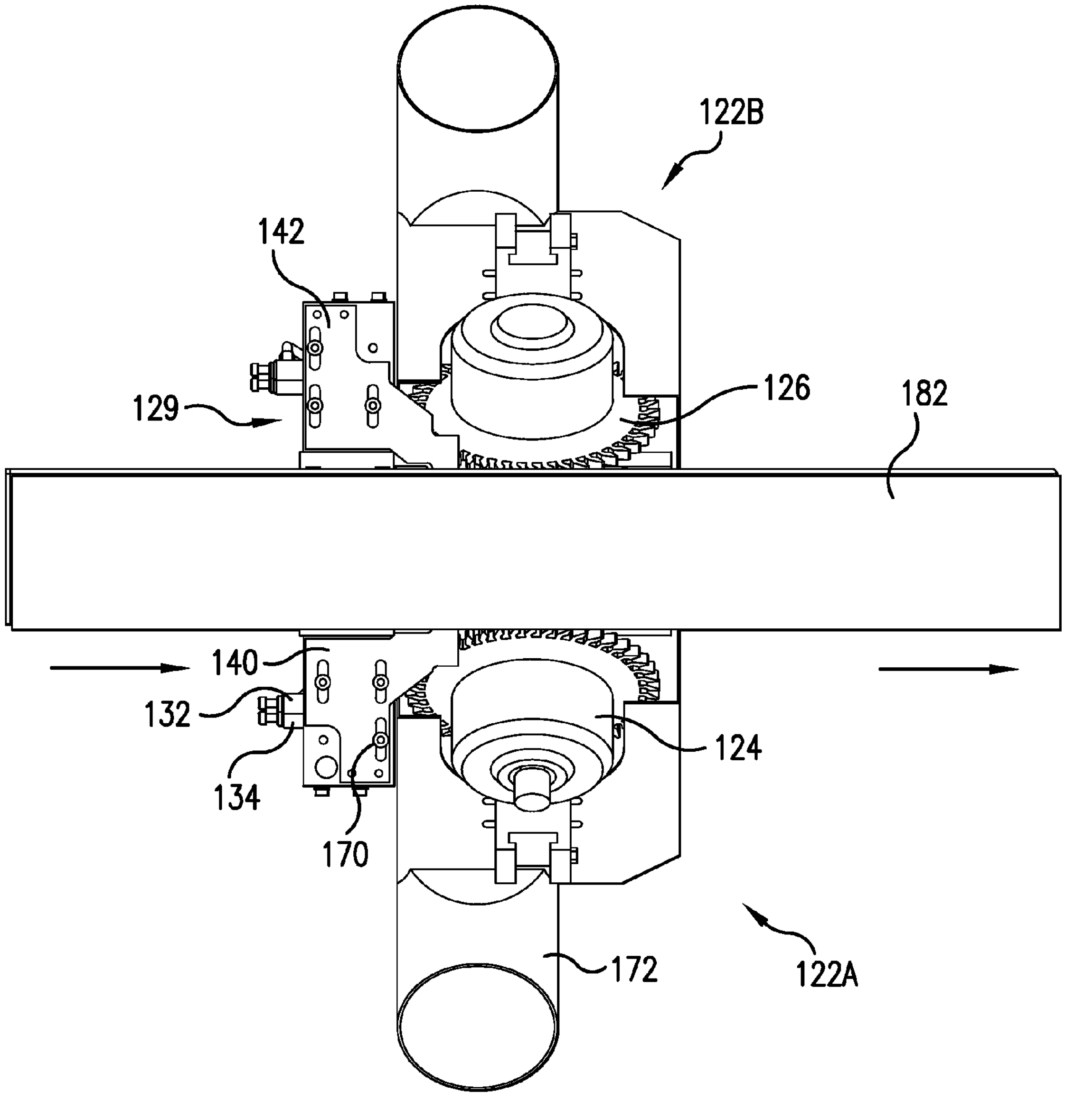
FIG. 15 is a top view of the apparatus shown in FIG. 11.
Figure 16:
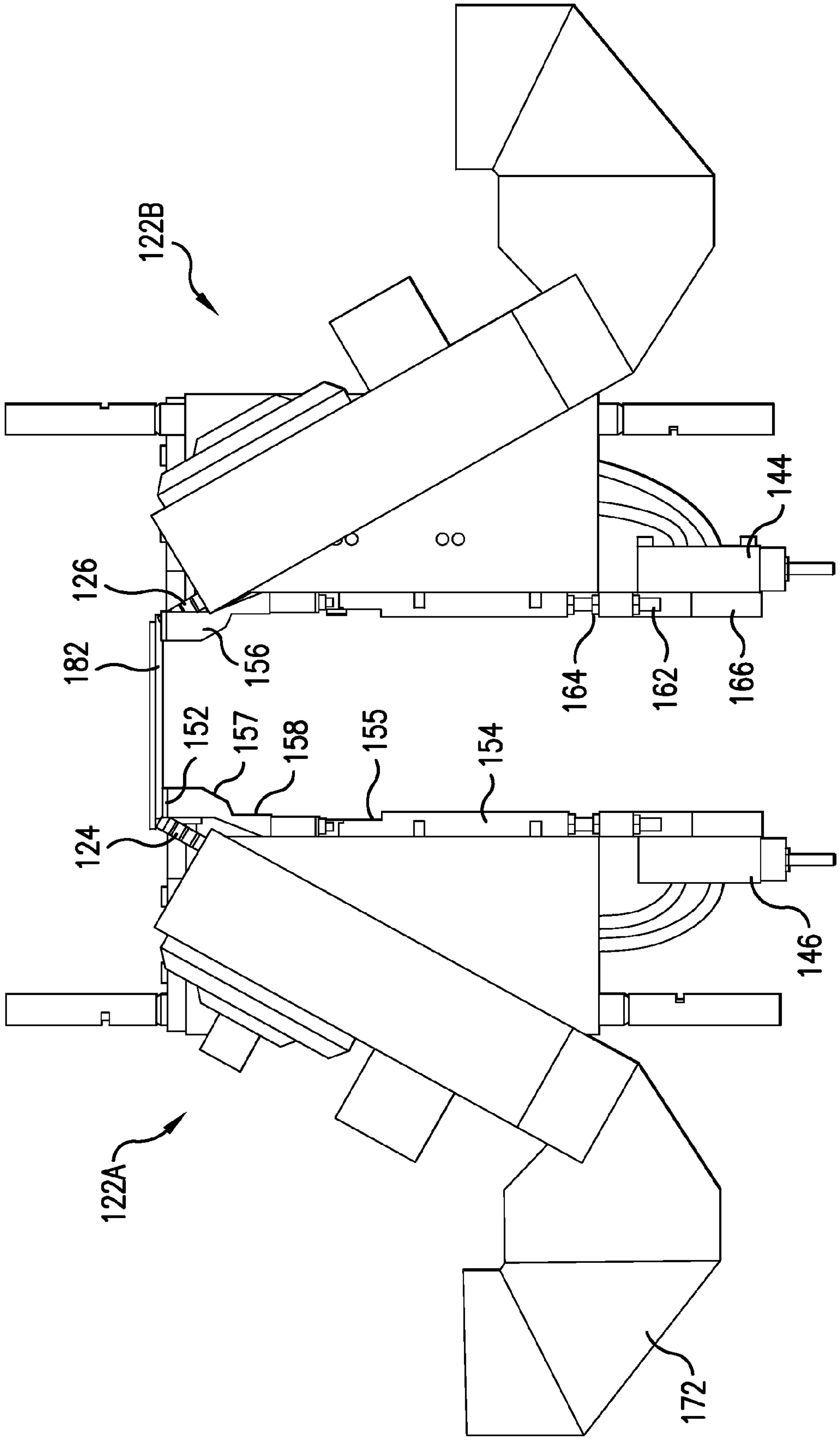
FIG. 16 is a second end view of the apparatus shown in FIG. 11, opposite the view shown in FIG. 12.
Figure 17:
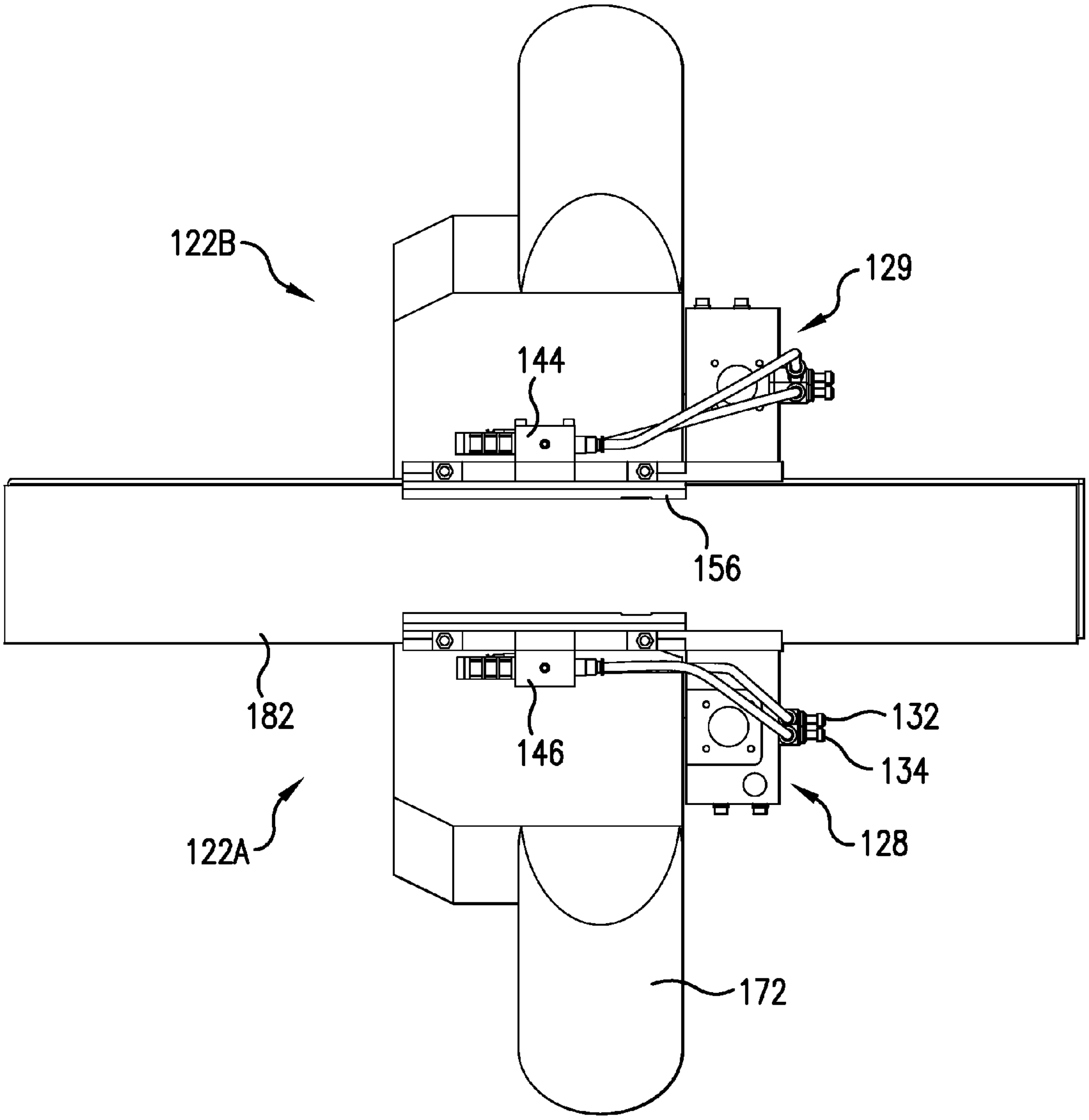
FIG. 17 is a bottom view of the apparatus shown in FIG. 11.

Plank 182 is delivered on the steel transfer belt, top face down, in a longitudinal direction moving toward bevel-cutting tool 124. Hold down compression is applied from the overhead rubber belt and the second guide shoe. The longitudinal direction of plank 182 is shown in FIGS. 13-15 by the directional arrows shown adjacent the plank. The second guide shoe comprises at least one roller (not seen) to allow the longitudinal movement of plank 182. A biasing device is configured to bias the second guide shoe in a direction toward first guide shoe 140 and roller bearing 136.

Air pressure passing through control valve 132 to modified guided cylinder 131 actuates a drive piston 135 (shown in FIG. 12) to move first guide shoe 140 in a vertical direction. Relying on compressibility of the overhead rubber belt and the second guide shoe, plank 182 is forced upward and out of the bevel-cut by modified guided cylinder 131, first guide shoe 140, and roller bearing 136.

When drive piston 135 extends upward, first guide shoe 140, and roller bearing 136, guide plank 182 away from bevel-cutting tool 124. When solenoid valve 146 reverses the gas pressure flow to control valve 134 and modified guided cylinder 131, drive piston 135 retracts to move first guide shoe 140 downward. First guide shoe 140 and roller bearing 134, in combination with the second guide shoe, guides plank 182 toward and away from the cutting blade of bevel-cutting tool 124.

When modified guided cylinder 131 is fully retracted, plank 182 is in maximum contact with the cutting blade of bevel-cutting tool 124. At this point, the maximum bevel depth is cut. When modified guided cylinder 131 is fully extended, plank 182 is in minimum contact with the cutting blade of bevel-cutting tool 124, and a minimum bevel depth is cut.

Each flow control valve 132 and 134 can control the rate at which modified guided cylinder 131 moves between the positions of full extension and full retraction. The extension and retraction rate is further influenced by the amount of pressure applied by the second guide shoe and the biasing device. The extension and retraction rate is further influenced by dampeners 148 and/or 149.

Figure 18:
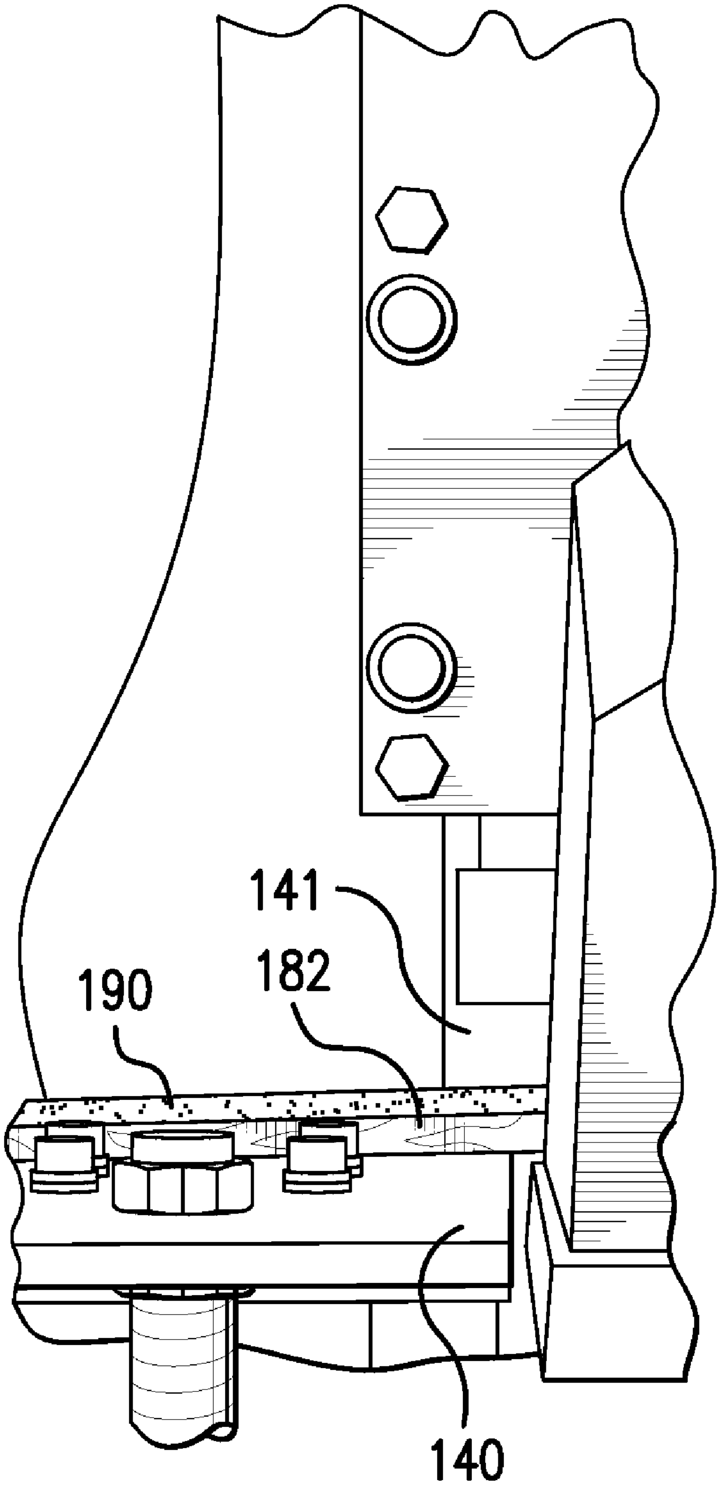
FIG. 18 is a perspective, enlarged, cutaway view of a system according to various embodiments including a second shoe that applies pressure to an opposite side of the plank relative to the first shoe.

FIG. 18 is a perspective, enlarged, cutaway view of a system according to various embodiments including a second guide shoe 141 that applies pressure to an opposite side of the plank relative to the first guide shoe 140. In the exemplary embodiment shown, second guide shoe 141 presses down against a rubber conveyor belt 190 that in turn presses against a plank 182. A drive system (not shown) can be used to drive conveyor belt 190 which in turn can move plank 182 through the bevel-cutting station.

In a bevel-cut system, for example, the embodiments described above and illustrated with reference to FIGS. 11-18, when modified guided cylinder 131 is in a fully retracted position, plank 182 is in maximum contact with bevel-cutting tool 124, and a maximum bevel width is cut. When modified guided cylinder 131 transitions to a fully extended position, plank 182 moves away from contact with bevel-cutting tool 124, decreasing the bevel-cut width. A random cut pattern resembling a sinusoidal function, with smooth transitions between bevel-cut widths produces a desired appearance of a randomly generated, hand-scraped bevel.

The process and/or system for sub-dividing a laminated flooring substrate as described in PCT/US07/005770 can be used with the process of forming irregular bevel edges on planks. Many if not all of the steps described in PCT/US07/005770 can generally occur prior to forming/creating the irregular bevel edge(s). These steps and/or system can include, but are not limited to, providing a laminated flooring substrate comprising a decorative pattern on a top surface of a core, wherein the decorative pattern comprises a plurality of indicators, comprising at least a left side indicator, a right side indicator, and at least two intermediate feature-position indicators between the left side indicator and the right side indicator;

detecting the positions of the plurality of indicators with a plurality of detecting devices, each detecting device assigned to a respective indicator;

aligning a plurality of saw blades, each with a respective one of the detected positions; and cutting the laminated flooring substrate along lines positioned at or off-set from each detected position, to form a plurality of laminated flooring planks. The system can include, but is not limited to, a transporting device configured to transport in a machine direction the laminated flooring substrate;

a plurality of detecting devices, each assigned to a respective indicator, to detect the positions of the indicators;

a plurality of saw blades, each positionable relative to a respective position of a respective one of the detected indicators; and an aligning device configured to align a separate saw blade per each position or off-set from each position of the detected indicator to cut the laminated flooring substrate to form a plurality of laminated flooring planks. One or more of the other options described in PCT/US07/05770 can be used herein, and this PCT application is incorporated in its entirety by reference herein.

A plank can comprise at least one bevel-cut edge, the at least one bevel-cut edge having a varying depth bevel-cut including a plurality of locations that reach the same maximum depth. Each of the maximum depth locations can be separated from one or more adjacent maximum depth locations by a length of bevel-cut edge that does not include a bevel-cut of maximum depth. The plank can comprise, for example, at least two locations that reach the same maximum depth and at least two lengths of bevel-cut edge that do not include a bevel-cut of maximum length.

Figure 19:
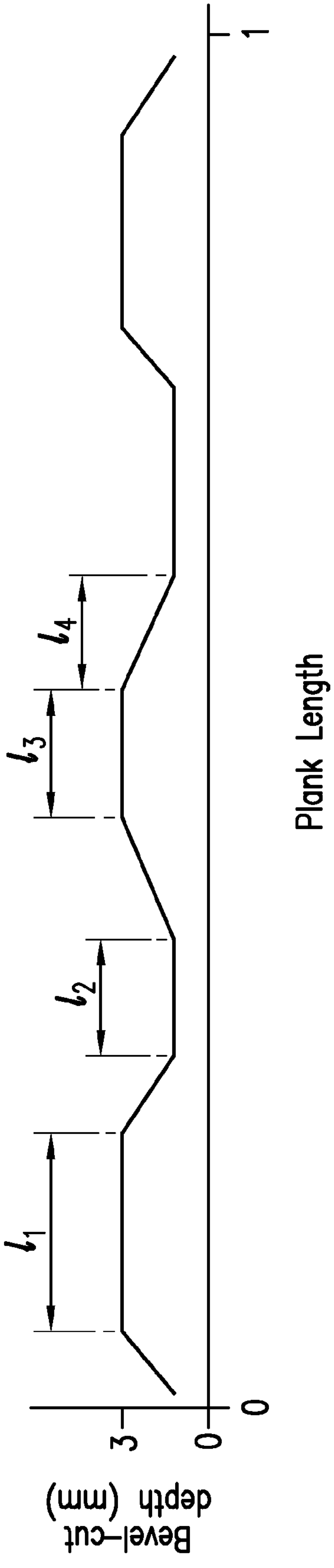
FIG. 19 is a graphical representation showing the depth of a bevel-cut edge over the length of a plank according to various embodiments of the present invention.

Referring to FIG. 19, a graphical representation showing the depth of a bevel-cut over the length of a plank is shown, according to various embodiments. As shown in FIG. 19, the plank can comprise at least one bevel-cut edge having a range of bevel-cut depths. As shown in FIG. 19, the bevel-cut depth can range, for example, from about 1 mm to about 3 mm. The bevel-cut edge can have a plurality of locations of maximum depth, for example, locations $l_1$ and $l_3$. In FIG. 19, $l_1$ and $l_3$ can reach the same maximum depth, for example, about 3 mm. Adjacent locations of maximum depth, for example, locations $l_1$ and $l_3$, can be separated by a length of the bevel-cut edge that does not include a bevel-cut of maximum depth, for example, location $l_2$. As shown in FIG. 19, $l_2$ can have a depth of, for example, about 1 mm. FIG. 19 further shows that, in some embodiments, a bevel-cut edge can have a transition length of intermediate depth between locations of maximum depth and locations of minimum depth, for example, as shown at location $l_4$.

Figure 20:
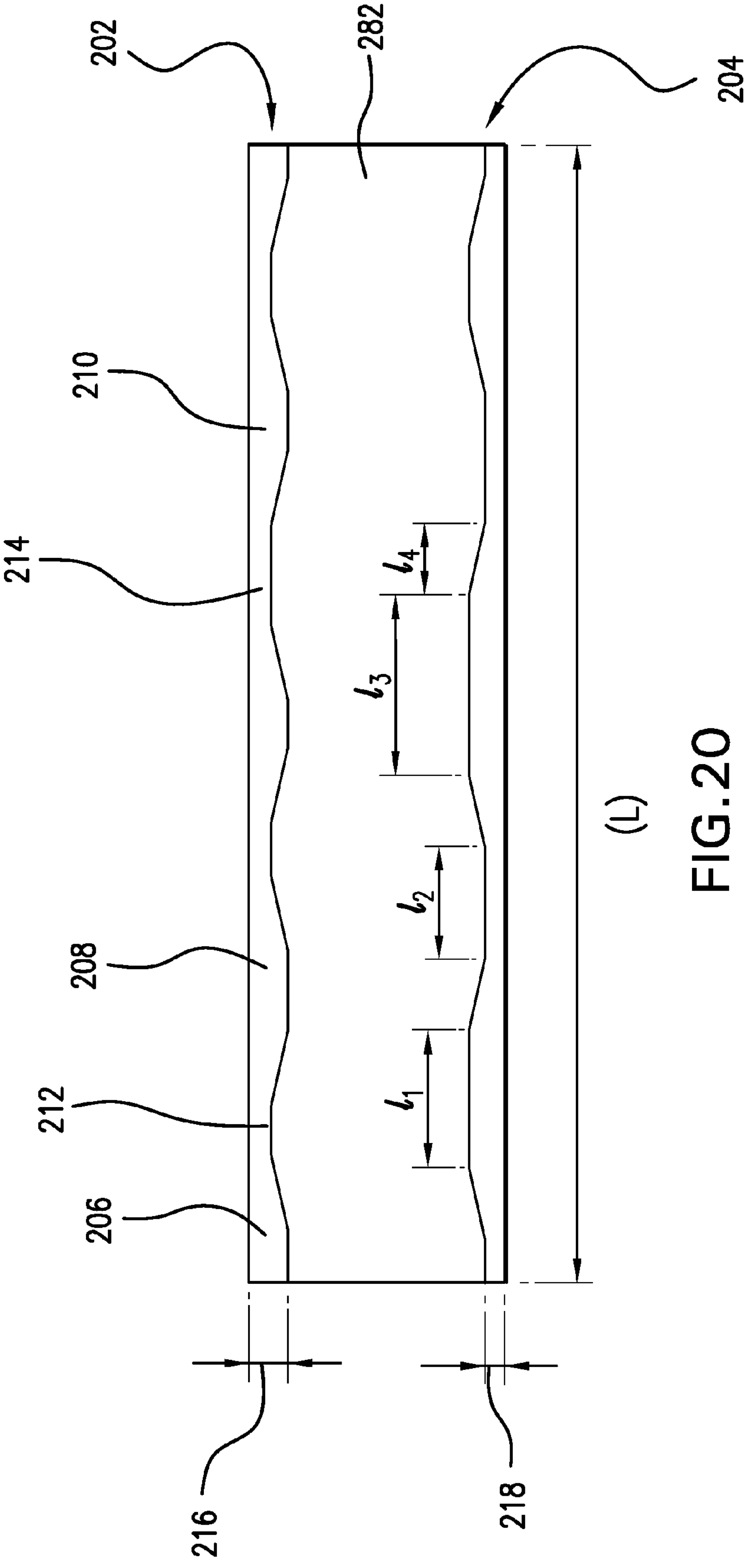
FIG. 20 is a top view of a plank (not drawn to scale) according to various embodiments of the present invention.

Referring to FIG. 20, a top view of a plank 282 according to various embodiments is shown. As shown by the example illustrated in FIG. 20, plank 282 can comprise two bevel-cut edges 202 and 204. Each bevel-cut edge 202 and 204 can independently have a varying depth bevel-cut including a plurality of locations 206, 208, and 210 that reach the same maximum depth 216. Each of maximum depth locations 206, 208, and 210 can be separated from one or more adjacent maximum depth locations by locations that do not include a bevel-cut of maximum depth, for example, locations 212 and 214. Locations 212 and 214 can comprise cuts of minimum depth 218.

Each maximum depth location can have a length and the length of each maximum depth location $l_1$ and $l_3$ can independently be, for example, from about 1 inch to about 24 inches, from about 2 inches to about 12 inches, or from about 4 inches to about 6 inches.

Bevel-cut edges 202 and 204 can each independently comprise a length that does not include a depth equal to the maximum depth, for example, a minimum depth and/or a length of intermediate depth. Similar to the locations of maximum depth, the locations of minimum depth can have lengths of, for example, from about 1 inch to about 24 inches, from about 2 inches to about 12 inches, or from about 4 inches to about 6 inches. Locations of intermediate depth can have lengths of, for example, of from about 1 inch to about 24 inches, from about 2 inches to about 12 inches, or from about 4 inches to about 6 inches.

Plank 282 can have an overall length (L) in a range of, for example, from about 12 inches to about 144 inches, or from about 36 inches to about 72 inches, however, the length of plank 282 is not so limited and can be of any suitable dimension.

Figure 21A:
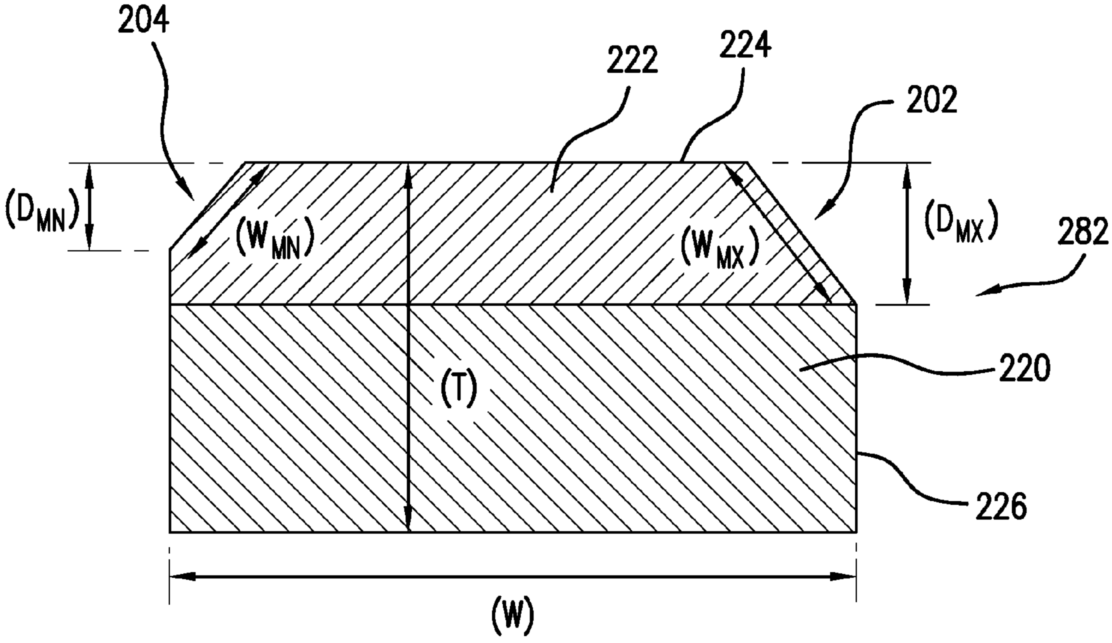
FIG. 21A is a cross-sectional side view of a plank (not drawn to scale) according to various embodiments of the present invention.
Figure 21B:
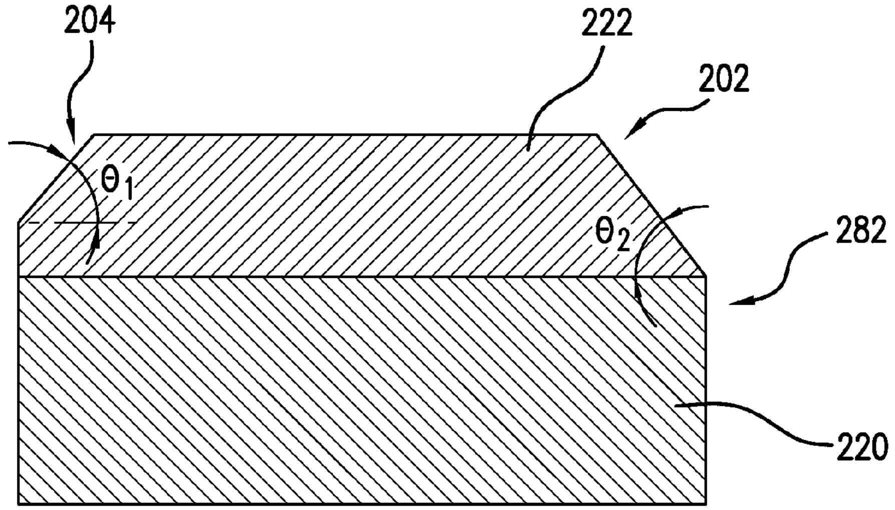
FIG. 21B is a cross-sectional side view of a plank (not drawn to scale) according to various embodiments of the present invention.

Referring to FIGS. 21A and 21B, cross-sectional side views of a plank according to various embodiments are shown. The cross-sectional views in FIGS. 21A and 21B are not necessarily drawn to scale and merely illustrate various dimensions of a plank according to various embodiments. Plank 282 can comprise a core layer 220 and a decorative layer 222. Plank 282 can have a total thickness (T) of, for example, from about ⅛ inch to about 1 inch, from about ¼ inch to about ¾ inch, or about ½ inch. Plank 282 can have a total width (W) of, for example, from about 1 inch to about 24 inches, from about 2 inches to about 12 inches, from about 3 inches to about 8 inches, or from about 4 inches to about 6 inches, however, width (W) of plank 282 is not so limited and can be of any dimension.

FIG. 21A shows the depth of a bevel-cut as the distance from a top surface 224 of plank 282 to a side surface 226 of plank 282, as measured in a direction perpendicular to the plane of top surface 224. FIG. 21A also shows an example of a maximum bevel-cut depth ($D_{mx}$) in bevel edge 202, and an example of a minimum bevel-cut depth ($D_{mn}$) in bevel edge 204. Bevel-cut edges 202 and 204 can have a minimum bevel-cut depth of, for example, from about 0 mm to about 3 mm, from about 0.5 mm to about 2 mm, or about 1 mm. Bevel-cut edges 202 and 204 can have a maximum bevel-cut depth of, for example, from about 1 mm to about 6 mm, from about 2 mm to about 5 mm, or about 3 mm.

FIG. 21A shows the width of a bevel-cut as the distance from the bevel edge at top surface 224 to the bevel edge at side surface 226. FIG. 21A shows an example of a maximum bevel-cut width ($w_{mx}$) in bevel edge 202 and a minimum bevel-cut width ($w_{mn}$) in bevel edge 204. Bevel-cut edges 202 and 204 can have a minimum bevel width, for example, of from about 0 mm to about 3 mm, or from about 0.5 mm to about 2 mm, or about 1 mm. Bevel-cut edges 202 and 204 can have a maximum bevel width, for example, of from about 1 mm to about 6 mm, from about 2 mm to about 5 mm, or about 3 mm.

As shown in FIG. 21B, bevel-cut edge 204 can have a bevel angle $\theta_1$, and bevel-cut edge 202 can have a bevel angle $\theta_2$. Bevel angles $\theta_1$, and $\theta_2$ can each independently be, for example, from about 25° to about 60°, from about 30° to about 50°, from about 40° to about 45°, or about 45°. $\theta_1$ can be greater than $\theta_2$, $\theta_1$ can be less than $\theta_2$, or $\theta_1$, can be equal to $\theta_2$. $\theta_1$ and $\theta_2$ can be substantially equal at one or more locations, or at no location.

Figure 22:
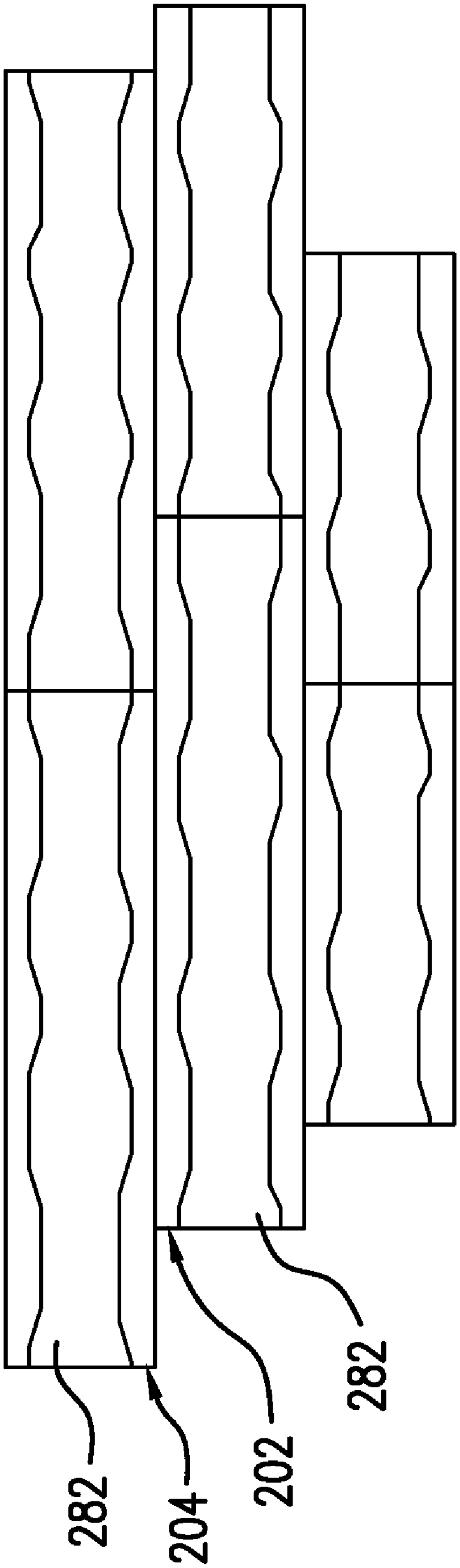
FIG. 22 is a top view of a surface covering according to various embodiments of the present invention.

Referring to FIG. 22, a top view of a surface covering system comprising a plurality of planks, according to various embodiments, is shown. The planks can each independently comprise one or more embodiments of the planks shown, for example, in FIG. 20, and/or described herein. Each plank 282 of the plurality of planks can have a length of, for example, from about 12 inches to about 72 inches, although the length of each plank is not limited to this range. Typically, the surface covering system can comprise a plurality of planks having an assortment of various lengths. The surface covering can be applied to a surface, for example, a floor surface, wherein at least one bevel-cut edge 202 of a first plank 282 can be positioned adjacent at least one bevel-cut edge 204 of a second plank 282. Planks 282, comprising bevel-cut edges 202 and 204 and arranged as shown in FIG. 22, can create a surface covering having the appearance of hand-scraped bevel-cut flooring. The plurality of planks 282 can comprise a plurality of laminated flooring planks although the planks can comprise any of the materials described herein.

Also, the plank, floor plank, or laminated flooring according to the present invention can have a substrate or core made of a variety of natural and/or synthetic materials, such as wood, polymeric, and the like. The core or substrate can be any conventional material used in laminate flooring, including, but not limited to, fiberboard (e.g., MDF, HDF), particle board, chip board, solid wood, veneers, engineered wood, thermoplastics, thermosets, oriented strand board (OSB), plywood, and the like. These laminated flooring substrates can comprise at least one core and at least one decorative pattern (the décor pattern or face design) on a top surface of the core. The decorative pattern serves as a decorative feature of the flooring. Any decorative pattern can be used such as, but not limited to, parquet, ceramic, stone, brick, marble, wood grain patterns, patterns with grout lines, other natural or unnatural surfaces, and the like. The decorative pattern can be printed on paper or on veneer; the paper can be coated or saturated with a resin(s) or a polymer(s), and then applied onto the top surface of the core. The top surface of the core can be textured by pressing the pattern layer onto the core, and a protective layer(s) can be created on top of the paper by a coating application(s). Heat and pressure can be used in this process. The protective layer can be called an overlay or the combined layer of resin, the protective layer, and the decorative pattern can be called an overlay pattern.

For purposes of the present invention, floor planks or floor tiles are described. However, it is realized that this description equally applies to surface coverings in general. Furthermore, while the term "floor plank" is used, it is to be understood that floor plank includes any geometrical design, especially designs having four sides, and the four sides can be rectangular, including squares, and can be any length or width such that the floor plank can serve as an elongated, rectangular floor plank or can be floor tile, which can be square or a rectangular shape of modular tile format. The present invention is not limited by any length or width, nor any geometrical design.

The plank or floor plank can be a vinyl sheet, resilient sheet vinyl flooring, linoleum, vinyl composition tiles (VCT flooring), resilent flooring planks/tiles, solid vinyl tile, LVT products (luxury vinyl tiles, as that term is understood in the art), flexible or rigid flooring tiles/planks (such as polymer floor products, where for instance the core or substrate is polymeric), wherein any of these examples can have one or more of the layers described in the present application. The floor plank can comprise: a) a first sheet having multiple sides, such as four sides. The first sheet can have an upper surface and a lower surface and the first sheet can comprise at least one base layer, a print design located above the base layer, and at least one wear layer located above the print design. The floor plank can have b) a second sheet having multiple sides and having an upper surface and a lower surface. The upper surface of the second sheet can be adhered to the lower surface of the first sheet. The thickness of the first sheet can be from 1.5 mm to 3 mm and the thickness of the second sheet can be from 1 mm to 2 mm. The floor plank can have one or more of the following mechanical properties:

a) Tensile strength (psi F ASTM D638: 750 psi+/−55 psi;
b) Elongation (%)—ASTM D638: 34+/−9;
c) Break Load (lbf)—ASTM D638: 31+/−1.5;
d) Flexural Force @ 0.3" (lbf)—Modified ASTM D790: 1+/−0.35;
e) Pneumatic Indentation at 3000 psi (inch)—<0.005; and/or
f) Residual Indentation at 750 psi (inch)—ASTM F-970: <0.002.

The floor plank can have one or more of the following de-lamination properties: a de-lamination force between the first sheet and second sheet based on modified ASTM D3164 having a shear bond (lbf): 30+/−6 and/or a peel bond (lbf): 4.5+/−0.5. The planks described in U.S. Patent Application No. 60/952,767 (incorporated in its entirety by reference herein) can be used in the present invention.

The laminated flooring according to the present invention can be made of a variety of materials as described above, have any construction, of any size or with any property known in the art of laminated flooring. For example, the laminated flooring can have a general construction comprising a four layer construction, although there is no limitation to the number of layers and the type of materials described herein. The four layer construction can have a highly abrasive resistance overlay that is clear, a décor layer or pattern (a pre-printed layer), a high density fiberboard (HDF) core, and a backer or balance layer. The core can be of a variety of materials, such as, but is not limited to, wood or plastic, chipboard, or HDF or medium density fiberboard (MDF). Other exemplary materials are described previously. All of the layers can have a paper component and can be treated with one or more resins, such as melamine or phenolic formaldehyde, or a urea formaldehyde solution, radiation pre-polymers such as epoxy acrylates, urethane acrylates, polyester acrylates, polyether acrylates or combinations thereof.

The paper which carries the decorative pattern can be any color, white, beige or others in roll or sheet form. It is preferred to use a non-white color paper for a darker decorative pattern because it alleviates an obvious white line at the interface of paper layers and core while the bevel edges are cut. The décor paper is placed by any method onto the core and a protective layer can be further applied on top of the paper. Wear resistant particles, such as $Al_2O_3$ can be in one or more of the coatings. As an option, the following is one way to form the laminate. With respect to the laminate on top of the core, a print layer is affixed to the top surface of the core, wherein the print layer has a top surface and a bottom surface. The print layer preferably is an aminoplast resin impregnated printed paper. Preferably, the print layer has a printed design. The printed design can be any design which is capable of being printed onto the print layer. The print layer is also known as a decor print layer. Generally, the print layer can be prepared by rotogravure printing techniques or other printing means such as digital printing. Once the paper has the design printed on it, the paper is then impregnated with an aminoplast resin or mixtures thereof. Preferably the aminoplast resin is a blend of urea formaldehyde and melamine formaldehyde. The print paper, also known as the decor paper, preferably should have the ability to have liquids penetrate the paper, such as a melamine liquid penetrating in about 3 to 4 seconds, and also maintains a wet strength and even fiber orientation to provide good reinforcement in all directions. The print paper does not need to be impregnated with the resin (this is optional), but instead can rely on slight resin migration from the adjoining layers during the lamination process (applying heat and/or pressure to laminate all layers to one). Preferably, the resin used for the impregnation is a mixture of urea formaldehyde and melamine formaldehyde resins. Urea formaldehyde can contribute to the cloudiness of the film that is formed and thus is not preferred for dark colors and the melamine resin imparts transparency, high hardness, scratch resistance, chemical resistance, and good formation, but may have high shrinkage values. Combining urea resins with melamine resins in a mixture or using a double impregnation (i.e., applying one resin after another sequentially) provides a positive interaction in controlling shrinkage and reducing cloudiness. Preferably, the type of paper used is 75 g/m$^2$ weight and having a thickness of 0.16 mm. The saturation of the coating preferably is about 64 g/m$^2$. Located optionally on the top surface of the print layer is an overlay. The overlay which can also be known as the wear layer is an overlay paper, which upon being affixed onto the print layer, is clear in appearance. The overlay paper is preferably a high abrasive overlay which preferably has aluminum oxide embedded in the surface of the paper. In addition, the paper can be impregnated with an aminoplast resin just as with the print layer Various commercial grades of high abrasive overlays are preferably used such as those from Mead Specialty Paper with the product numbers TMO 361, 461 (70 gram/m$^2$ premium overlay from Mead), and 561 wherein these products have a range of Taber values of 4000 to 15000. The type of paper preferably used has a weight of about 46 g/m$^2$ and a thickness of about 0.13 mm. With respect to the print layer and the overlay, the amount of aminoplast resin is preferably from about 60 to about 140 g/m$^2$ and more preferably from about 100 to about 120 g/m$^2$. As an option, an underlay can be located and affixed between the bottom surface of the print layer and the top surface of the core. Preferably the underlay is present and is paper impregnated with an aminoplast resin as described above with respect to the print layer and overlay. Preferably, the underlay is Kraft paper impregnated with aminoplast resins or phenolics and more preferably phenolic formaldehyde resin or melamine formaldehyde resin which is present in an amount of from about 60 g/m$^2$ to about 145 g/m$^2$ and more preferably from about 100 g/m$^2$ to about 120 g/m$^2$ paper. The type of paper used is preferably about 145 g/m$^2$ and having a thickness of about 0.25 mm. The underlay is especially preferred when extra impact strength resistance is required. More than one layer of coating or layer of protection can be applied onto a top surface of the core and for a variety of purposes. Additional layers can be formed on the bottom of the core as well, such as a backing layer. A backing layer, for example, can be a melamine coated paper layer or any other desired material. Heat and/or pressure can be used to attach all layers including the decorative pattern onto the core. Other known applications in the art can be used to apply the decorative pattern onto a top surface of the core of the laminated flooring substrate.

The product size, i.e., of the final laminated flooring, can have any desirable size and number of bevels. For example, the product size can be 12 to 60 inches in length, 2 to 24 inches in width and ⅛ inch to ¾ inch in thickness, with one to four sided bevels. The bevels can have any bevel angle or bevel width. For example, the bevels can have a bevel angle from about 25 to about 60 degrees, and a bevel width of at least 0.5 mm. Preferably, the bevel angle is from about 40 to about 45 degrees, and/or the bevel width is from about 1.0 mm to about 3.0 mm or more, or from about 1.5 mm to about 2.0 mm.

The laminated flooring can have any type of shape and any type of bevel edge. For example, the laminated flooring can have a square shape or a rectangle shape. The bevel edge can have more than one angled surface. For example, part of the bevel edge can have an angle of 45 degrees while another part of the bevel edge can have an angle of 30 degrees. The bevel edge can be on one side or more than one side of the laminated flooring. The bevel edge can be continuous or discontinuous on one or more sides of the laminated flooring. For instance, the bevel edge can be a fraction of the side or can be interrupted by a non-bevel surface/edge on a side of the laminated flooring. The bevel surface can also have any shape and size (length or width). For example, the bevel surface can have a shape other than a perfect rectangle. The bevel surface can be rough (non-even or non-smooth) or smooth. An example of a rough surface can be seen when a particle board is cut and parts of the particles extend above the plane of the cut surface.

Another optional aspect of the core is the presence of a groove and/or a tongue profile on at least one side or at least two sides or edges of the core wherein the sides or edges are opposite to each other (or all sides or edges, e.g., four sides). For instance, the core design can have a tongue profile on one edge and a groove profile on the opposite edge. It is also possible for both edges which are opposite to each other to have a groove profile. The tongue or groove can have a variety of dimensions. The groove can be present on two opposite edges and/or can have an internal depth dimension of from about 5 mm to about 12 mm and a height of from about 3 mm to about 5 mm. The bottom width of the side having the groove can be slightly shorter than the upper width of the same side to ensure no gap exists between planks after butting together. With respect to the edges of the floor panels, which are joined together in some fashion, the floor panels can have straight edges or can have a tongue and groove design or there can be some intermediate connecting system used to join the floor panels together such as a spline or other connecting device. Again, any manner in which floor panels can be joined together is embodied by the present application. For purposes of the present invention, the floor panel can have a tongue and groove profile or similar connecting design on the side edges of the floor panel. Examples of floor panel designs, shapes, and the like that can be used herein include, but are not limited to, the floor panels described in U.S. Pat. Nos. 6,101,778; 6,023,907; 5,860,267; 6,006,486; 5,797,237; 5,348,778; 5,706,621; 6,094,882; 6,182,410; 6,205,639; 3,200,553; 1,764,331; 1,808,591; 2,004,193; 2,152,694; 2,852,815; 2,882,560; 3,623,288; 3,437,360; 3,731,445; 4,095,913; 4,471,012; 4,695,502; 4,807,416; 4,953,335; 5,283,102; 5,295,341; 5,437,934; 5,618,602; 5,694,730; 5,736,227; and 4,426,820 and U.S. Published Patent Application Nos.

20020031646 and 20010021431 and U.S. patent application Ser. No. 09/460,928, and all are incorporated in their entirety by reference herein.

The floor panel can have at least two side edges wherein one side edge has a tongue design and the opposite side having a groove design, and wherein the tongue and groove are designed to have a mechanical locking system. These two edges are preferably the longer of the four side edges. The remaining two edges, preferably the short joints, can also have a mechanical locking system, such as the tongue and groove design, or the short joints can have a standard tongue and groove design, wherein one edge has a standard tongue design and the other edge has a standard groove design. The standard design is a design wherein the tongue and groove is not a mechanical locking system but is generally a tongue having a straight tongue design in the middle of the edge and the groove design has the counterpart groove to receive this tongue. Such a design has many advantages wherein a mechanical locking system can be used to connect the long sides of the plank, typically by tilting the tongue into the groove of a previously laid down plank. Then, the standard tongue and groove design on the short edges permits the connecting of the short edge of the plank to the previously laid plank without any tilting motion or lifting of the previous laid planks. The adhesive can be applied to all edges or just to the standard tongue and groove edges.

Thus, the present invention encompasses any type of joint or connecting system that adjoins edges of floor panels together in some fashion with the use of straight edges, grooves, channels, tongues, splines, and other connecting systems. Optionally, the planks can be joined together wherein at least a portion of the planks are joined together at least in part by an adhesive. An example of such a system is described in U.S. patent application Ser. No. 10/205,408, which is incorporated herein in its entirety.

The flooring products, design, and other configurations described in U.S. patent application Ser. No. 11/192,442 and/or U.S. patent application Ser. No. 10/697,532, as well as U.S. Pat. Nos. 6,986,934; 6,794,002; 6,761,008; and 6,617,009 can be used herein and are incorporated in their entirety by reference herein.

The irregular bevel edge surface can be subjected to methods and systems that apply a printing of a pattern on the irregular bevel edge/surface, for instance, using ink jet (or laser printing) for printing on bevel surfaces and/or one or more other surfaces, such as surfaces of the tongue and/or groove that are present on laminated flooring, with colors and decorative patterns matching the décor patterns and face designs of the primary surface (e.g. top surface) of the laminated flooring. The printing system and/or method described in U.S. patent application Ser. No. 11/651,955 can be fully used herein to print a pattern on the bevel edge, and this application is incorporated in its entirety by reference herein.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method for creating an irregular bevel edge on a plank, comprising:

moving an edge of the plank in a longitudinal direction into contact with a bevel tool while keeping the bevel tool in a fixed position, to form a bevel-cut;

moving the plank back and forth under control of a programmed controller in a direction normal to the longitudinal direction while the edge of the plank is in contact with the bevel tool;

varying a depth of the bevel-cut from a maximum depth to a minimum depth; and continuously varying the depth of the bevel-cut between the maximum depth and the minimum depth.

2. The method of claim 1, wherein the programmed controller controls the back and forth movement of the plank to occur at irregular intervals.

3. The method of claim 1, further comprising:

providing a guided cylinder adapted to move the plank back and forth in the direction normal to the longitudinal direction; and applying sufficient pressure to the guided cylinder to actuate the cylinder to move the plank.

4. The method of claim 3, wherein applying sufficient pressure comprises applying pressure from a compressed gas source.

5. The method of claim 3, further comprising providing a control valve adapted to control the amount of pressure applied to actuate movement of the guided cylinder; and controlling the amount of pressure applied to actuate movement of the guided cylinder to control the rate of the movement.

6. The method of claim 1, wherein the plank is moved back and forth in a range of from about 3 cycles to about 6 cycles per plank.

7. The method of claim 1, wherein the plank is moved in a linear direction normal to the longitudinal direction, by about 3 mm.

8. The method of claim 1, wherein the plank comprises a laminated flooring plank.

9. The method of claim 1, wherein said plank moving in said longitudinal direction is at a line speed of at least 50 m per minute.

10. The method of claim 1, wherein said plank moving in said longitudinal direction is at a line speed of at least 120 m per minute.

11. The method of claim 1, wherein said plank moving in said longitudinal direction is at a line speed of from about 50 m to about 200 m per minute.

* * * * *